(12) United States Patent
Iyer et al.

(10) Patent No.: US 12,048,009 B2
(45) Date of Patent: Jul. 23, 2024

(54) CHANNEL ACCESS FOR UNLICENSED SPECTRUM IN MMW OPERATION

(71) Applicant: InterDigital Patent Holdings, Inc., Wilmington, DE (US)

(72) Inventors: Lakshmi R. Iyer, King of Prussia, PA (US); Qing Li, Princeton Junction, NJ (US); Mohamed Awadin, Plymouth Meeting, PA (US); Guodong Zhang, Woodbury, NY (US); Pascal M. Adjakple, Great Neck, NY (US); Yifan Li, Conshohocken, PA (US); Zhuo Chen, Claymont, DE (US); Allan Y. Tsai, Boonton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 341 days.

(21) Appl. No.: 17/632,331

(22) PCT Filed: Aug. 14, 2020

(86) PCT No.: PCT/US2020/046270
§ 371 (c)(1),
(2) Date: Feb. 2, 2022

(87) PCT Pub. No.: WO2021/034628
PCT Pub. Date: Feb. 25, 2021

(65) Prior Publication Data
US 2022/0287093 A1 Sep. 8, 2022

Related U.S. Application Data

(60) Provisional application No. 62/888,044, filed on Aug. 16, 2019.

(51) Int. Cl.
*H04W 74/0816* (2024.01)
*H04B 7/06* (2006.01)

(52) U.S. Cl.
CPC ...... *H04W 74/0816* (2013.01); *H04B 7/0695* (2013.01)

(58) Field of Classification Search
None
See application file for complete search history.

(56) References Cited

U.S. PATENT DOCUMENTS

| 2018/0213560 A1 | 7/2018 | Naghshvar et al. |
| 2019/0059106 A1* | 2/2019 | Zhang ............ H04W 16/14 |

(Continued)

FOREIGN PATENT DOCUMENTS

WO 2019/079500 A1 4/2019

OTHER PUBLICATIONS

Samsung, "Channel access procedures for NR-U", 3GPP TSG-RAN WG1 Meeting #94, R1-1808768, Aug. 20-24, 2018, 6 pages.

*Primary Examiner* — Anh Vu H Ly
(74) *Attorney, Agent, or Firm* — Flaster Greenberg P.C.

(57) ABSTRACT

The present application at least describes a method for obtaining channel access in a network. The method includes a step of selecting, via a gNodeB, a spatial filter from a first set of spatial filters to perform listen before talk (LBT). The method includes a step of detecting, via the gNodeB, a channel in an idle state. The method also includes a step of obtaining, a directional channel occupancy time (COT) in the channel in a direction of the selected spatial filter. The method also includes a step of transmitting, to a node, a channel access indicator transmission (CAI-T) on a beam in the cot via a spatial filter of a second set of spatial filters. The method further includes a step of receiving, from the node, a channel access indicator response (CAI-R). The method further includes a step of sensing, via short channel sensing and via the spatial filter or another spatial filter of the second set of spatial filters, the channel is clear. The method even further includes a step of sending, via the channel, informa- (Continued)

tion to the node using one or more spatial filters of the second set of spatial filters. Other embodiments of this aspect include corresponding computer systems, apparatus, and computer programs recorded on one or more computer storage devices, each configured to perform the actions of the methods.

20 Claims, 37 Drawing Sheets

(56) References Cited

U.S. PATENT DOCUMENTS

| | | | |
|---|---|---|---|
| 2019/0215865 A1* | 7/2019 | Li | H04L 5/0055 |
| 2019/0230706 A1* | 7/2019 | Li | H04B 7/0639 |
| 2019/0274165 A1* | 9/2019 | Pu | H04B 7/088 |
| 2020/0037169 A1* | 1/2020 | Chendamarai Kannan | H04L 5/0055 |
| 2020/0053599 A1* | 2/2020 | Damnjanovic | H04L 27/0006 |
| 2020/0314906 A1* | 10/2020 | Goyal | H04B 7/0695 |
| 2021/0058967 A1* | 2/2021 | Oteri | H04W 72/23 |

* cited by examiner

CHANNEL ACCESS FOR UNLICENSED SPECTRUM IN MMW OPERATION

CROSS-REFERENCE TO RELATED APPLICATIONS

This application is the National Stage Application of International Patent Application No. PCT/US2020/046270 filed Aug. 14, 2020, which claims the benefit of priority of U.S. Provisional application No. 62/888,044 filed Aug. 16, 2019, entitled "Channel Access for Unlicensed Spectrum in mmW Operation," the contents of which is incorporated by reference herein.

FIELD

The present application is directed to methods, apparatuses and systems for channel access for unlicensed spectrum in mmW operation.

BACKGROUND

It is reasonable basis to use directional sensing in mmW spectrum to achieve better spatial reuse. However, directional sensing raises challenges in designing a network. These challenges include: (i) efficient determination of the spatial filter for directional sensing; (ii) acquisition of Channel Occupancy Time (COT) in multiple spatial directions and multiple subbands; and (iii) effective management of hidden nodes. Thus, architectures and signaling methods are desired to enable directional reuse and ensure fair coexistence with other, similar or different technologies.

Large antenna arrays in a mmW spectrum produce highly directional beams with high power bandwidth (HPBW), ranging from 5-30 degrees and 10-20 dBi gains. For highly narrow beams, the receiver may effectively tune its spatial filter to eliminate interference from other directions. While hidden nodes may be less contentious in a centralized network, when compared to a WiGiG network, problems can arise when multiple networks share the spectrum in an uncoordinated manner and high node density. The nodes may belong to another NR-U network or a WiGiG network. The nodes could also belong to the same network. For example, in a non-ideal backhaul deployment a second transmission reception point (TRP2) could be a hidden node to UE1 communicating with TRP1.

Separately, autonomous UL transmissions through configured grant from multiple UEs can cause interference. Device to Device (D2D) sidelinks can also suffer from hidden nodes due to less coordination between the nodes. A strategy for channel access in mmW spectrum is desired to overcome the issues based on the deployment scenario, traffic and the environment.

SUMMARY

One aspect of the application is directed to a method for obtaining channel access in a network. The method includes a step of selecting, via a gNodeB, a spatial filter from a first set of spatial filters to perform listen before talk (LBT). The method includes a step of detecting, via the gNodeB, a channel in an idle state. The method also includes a step of obtaining, a directional channel occupancy time (COT) in the channel in a direction of the selected spatial filter. The method also includes a step of transmitting, to a node, a channel access indicator transmission (CAI-T) on a beam in the cot via a spatial filter of a second set of spatial filters. The method further includes a step of receiving, from the node, a channel access indicator response (CAI-R). The method further includes a step of sensing, via short channel sensing and via the spatial filter or another spatial filter of the second set of spatial filters, the channel is clear. The method even further includes a step of sending, via the channel, information to the node using one or more spatial filters of the second set of spatial filters. Other embodiments of this aspect include corresponding computer systems, apparatus, and computer programs recorded on one or more computer storage devices, each configured to perform the actions of the methods.

Another aspect of the application is directed to an apparatus. The apparatus includes a non-transitory memory for obtaining channel access in a network. The apparatus also includes a processor operably coupled to the non-transitory memory configured to execute instructions. One of the instructions includes receiving, from a gNodeB, a CAI-T on a beam in a COT of a channel. Another one of the instructions includes selecting a spatial filter from a set of spatial filters. Another one of the instruction includes sensing via short channel sensing and via the selected spatial filter of the set of spatial filters. Yet another one of the instructions includes transmitting, to the gNodeB, a channel CAI-R using the selected spatial filter or another spatial filter of the set of spatial filters. Yet even another one of the instructions includes receiving information from the gNodeB. A further instruction includes sensing, via short channel sensing and a second spatial filter of the set of spatial filters. Yet even a further instruction includes determining the channel is clear. Yet even another instruction includes transmitting, to the gNodeB, one or more of data and control information via a third filter from the set of spatial filters. Other embodiments of this aspect include corresponding computer systems, apparatus, and computer programs recorded on one or more computer storage devices, each configured to perform the actions of the methods.

Yet another aspect of the application is directed to an apparatus including a non-transitory memory for obtaining channel access in a network. The apparatus also includes a processor operably coupled to the non-transitory memory configured to execute instructions. One of the instructions includes selecting a spatial filter from a first set of spatial filters to perform LBT. Another one of the instructions includes obtaining, a directional COT in a channel in a direction of the selected spatial filter. Another one of the instructions includes transmitting, to a node, a CAI-T on a beam in the COT via a spatial filter of a second set of spatial filters. Yet another instruction includes receiving, via the node, a CAI-R. Yet even another instruction includes sensing, via short channel sensing and employing the spatial filter or another spatial filter of the second set of spatial filters, the channel is clear. A further instruction includes sending, via the channel, information to the node using one or more spatial filters of the second set of spatial filters. Other embodiments of this aspect include corresponding computer systems, apparatus, and computer programs recorded on one or more computer storage devices, each configured to perform the actions of the methods.

This summary is provided to introduce a selection of concepts in a simplified form that are further described below in the Detailed Description. This Summary is not intended to limit the scope of the claimed subject matter. The foregoing needs are met, to a great extent, by the present application described herein.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
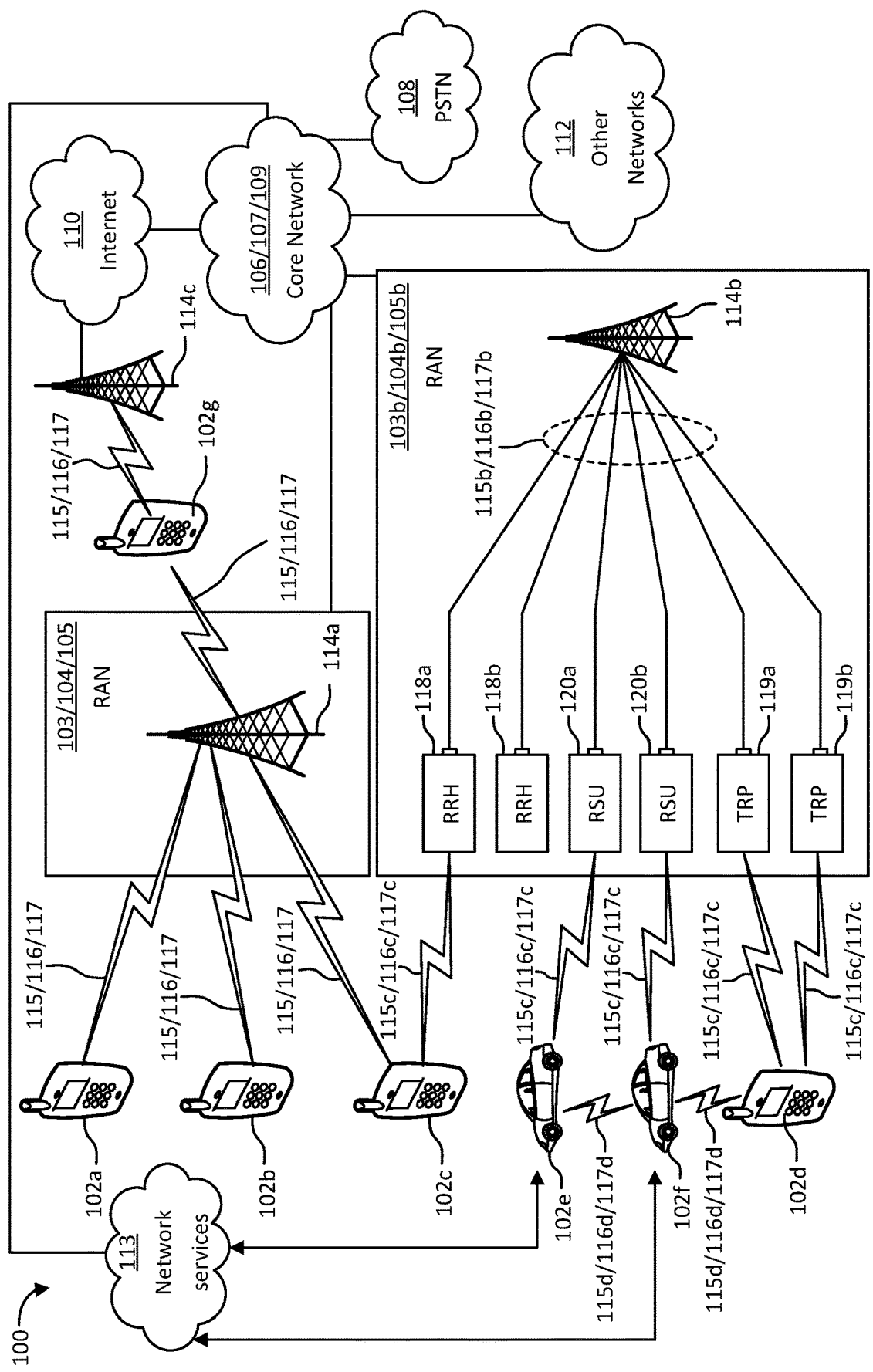
FIG. 1A illustrates an exemplary communications system according to an aspect of the application.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other. Reference in this specification to "one aspect," "an aspect," or "one or more aspects," or the like encompasses one or more embodiments listed thereunder.

Definitions/Acronyms

Provided below are definitions for terms and phrases commonly used in this application in Table 1.

TABLE 1

| Acronym | Term or Phrase |
| --- | --- |
| BWP | Bandwidth Part |
| CA | Carrier Aggregation |
| CAI | Channel Access Indicator |
| CAI-R | Channel Access Indicator - response |
| CAI-T | Channel Access Indicator - transmission |
| CAT2 | Category 2 |
| CAT4 | Category 4 |
| CBG | Code Block Group |
| CCA | Clear Channel Assessment |
| CG | Configured Grant |
| COT | Channel Occupancy Time |
| C-RNTI | Cell Radio-Network Temporary Identifier |
| CSI-RS | Channel State Information Reference Signal |
| CSMA/CA | Carrier Sense Multiple Access/Channel Access |
| DC | Dual Connectivity |
| DL | Downlink |
| DL-SCH | Downlink Shared Channel |
| DMRS | Demodulation Reference Signal |
| D2D | Device to Device |
| eCCA | Extended Clear Channel Assessment |
| eMBB | Enhanced Mobile Broadband |
| eNB | Enhanced NodeB |
| ED | Energy Detection |
| FBLBT | Feedback Based Listen Before Talk |
| FDD | Frequency Division Duplex |
| FR1 | Frequency region 1 (sub 6 GHz) |
| FR2 | Frequency region 2 (mm Wave) |
| gNB | NR NodeB |
| HARQ | Hybrid ARQ |
| HPBW | Half Power Beam Width |
| IE | Information Element |
| IIOT | Industrial Internet of Things |
| LAA | License Assisted Access |
| LBT | Listen Before Talk |
| LTE | Long Term Evolution |
| MAC | Medium Access Control |
| MCS | Modulated Coding Scheme |
| MCOT | Maximum Channel Occupancy Time |
| NAV | Network Allocation Vector |
| NFBLBT | Non-Feedback Based Listen Before Talk |
| NR | New Radio |
| OS | OFDM Symbol |
| OFDM | Orthogonal Frequency Division Multiplexing |
| PCell | Primary Cell |
| PCP/AP | Personal Basic Service Set (PBCC) Control Point/Access Point |
| PD | Preamble Detection |
| PHY | Physical Layer |
| PRACH | Physical Random Access Channel |
| QCL | Quasi CoLocation |

TABLE 1-continued

| Acronym | Term or Phrase |
| --- | --- |
| RACH | Random Access Channel |
| RAN | Radio Access Network |
| RNTI | Radio Network Temporary Identifier |
| RAR | Random Access Response |
| RAT | Radio Access Technology |
| RRC | Radio Resource Control |
| RS | Reference Signal |
| RTS/CTS | Request to Send/Clear to Send |
| Scell | Secondary Cell |
| SI | System Information |
| SR | Scheduling Request |
| STA | Station |
| TB | Transport Block |
| TCI | Transmission Configuration Indicator |
| TDD | Time Division Duplex |
| TRP | Transmission and Reception Point |
| TTI | Transmission Time Interval |
| UE | User Equipment |
| UL | Uplink |
| UL-SCH | Uplink Shared Channel |
| URLLC | Ultra-Reliable and Low Latency Communications |

Feedback based LBT (FBLBT) for channel access is enabled by sending a CAI-T to a receiver and receiving a CAI-R from the receiver. CAI-R indicates the subbands where the channel is idle for the receiver. CAI-R may also indicate the interference level at the receiver.

Non-Feedback based LBT (NFBLBT) without requiring CAI-T and CAI-R communications may also be supported. It is envisaged according to the application the node or a network may switch semi-statically or dynamically between using FBLBT and NFBLBT.

The transmitter sends a channel reservation signal and COT information to confirm that it has acquired the channel. The COT information may carry the duration of channel access, subbands, spatial filter information. This spatial filter information may be indicated in relationship to a quasi-co-located (QCL) reference signal (RS) such as SSB, CS-RS, DMRS.

The spatial domain filter used for LBT determines the spatial directionality of the acquired COT. The spatial filter may be adapted to increase or decrease the beam width or angular spread and may be used to steer the beam in space. The contention window size may be adapted based on the feedback from the CAI-R. A node may access the channel in multiple directions simultaneously.

The node may perform random backoff-based (CAT4) access in one spatial direction to access the channel. The node may perform CAT2 based sensing to simultaneously acquire channel in another spatial direction.

COT information may be provided as part of the reservation signal or a control signal. It may be broadcast or groupcast or UE specific control information.

The node maintains a table of active COT indications from other nodes and the corresponding spatial filters used to receive them. The node will not access the channel corresponding to those spatial filters, COT durations and subbands in the table until their COT expires.

General Architecture

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
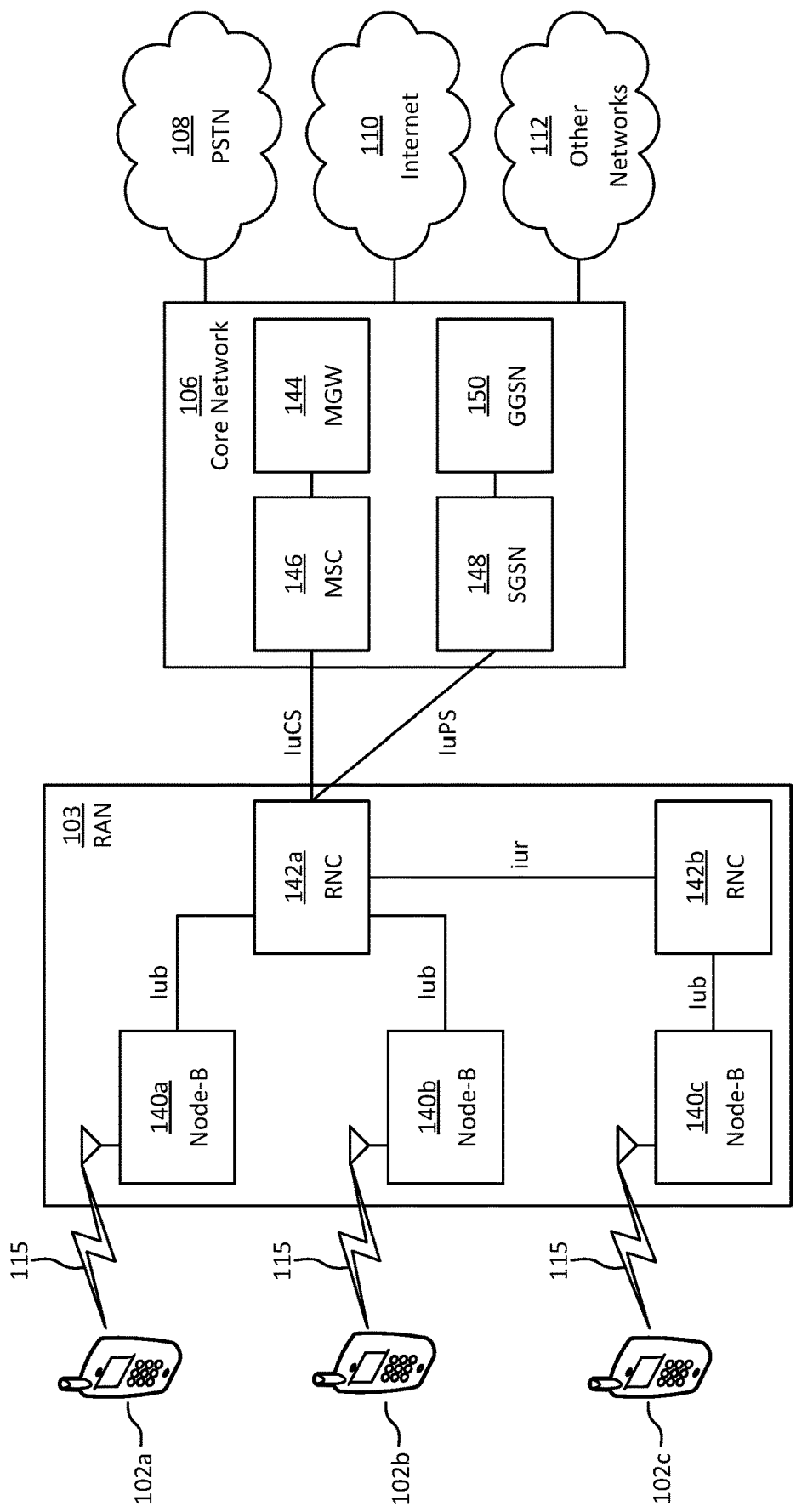
FIG. 1B illustrates an exemplary apparatus configured for wireless communication according to an aspect of the application.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
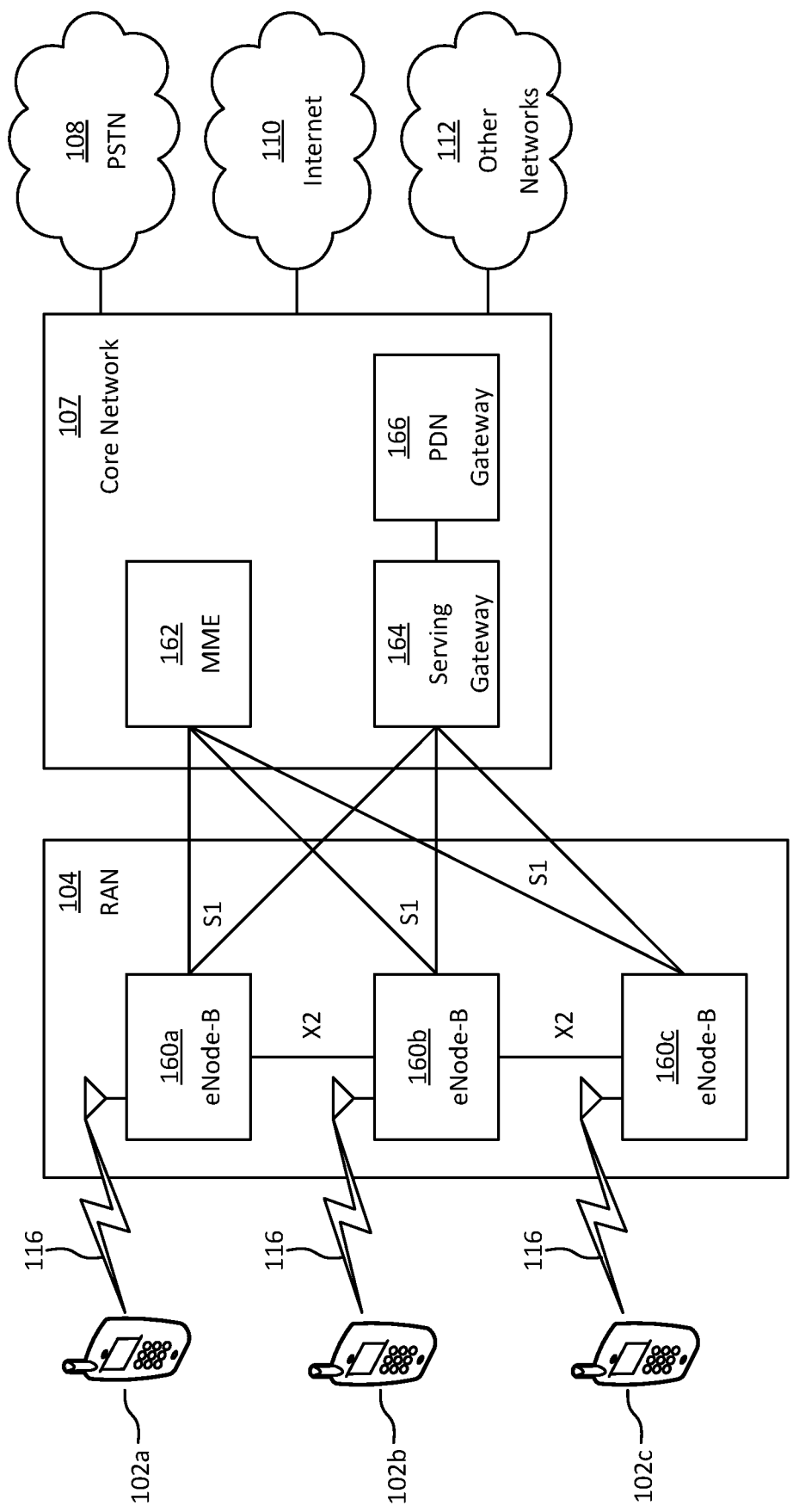
FIG. 1C illustrates a system diagram of a radio access network and a core network according to an aspect of the application.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
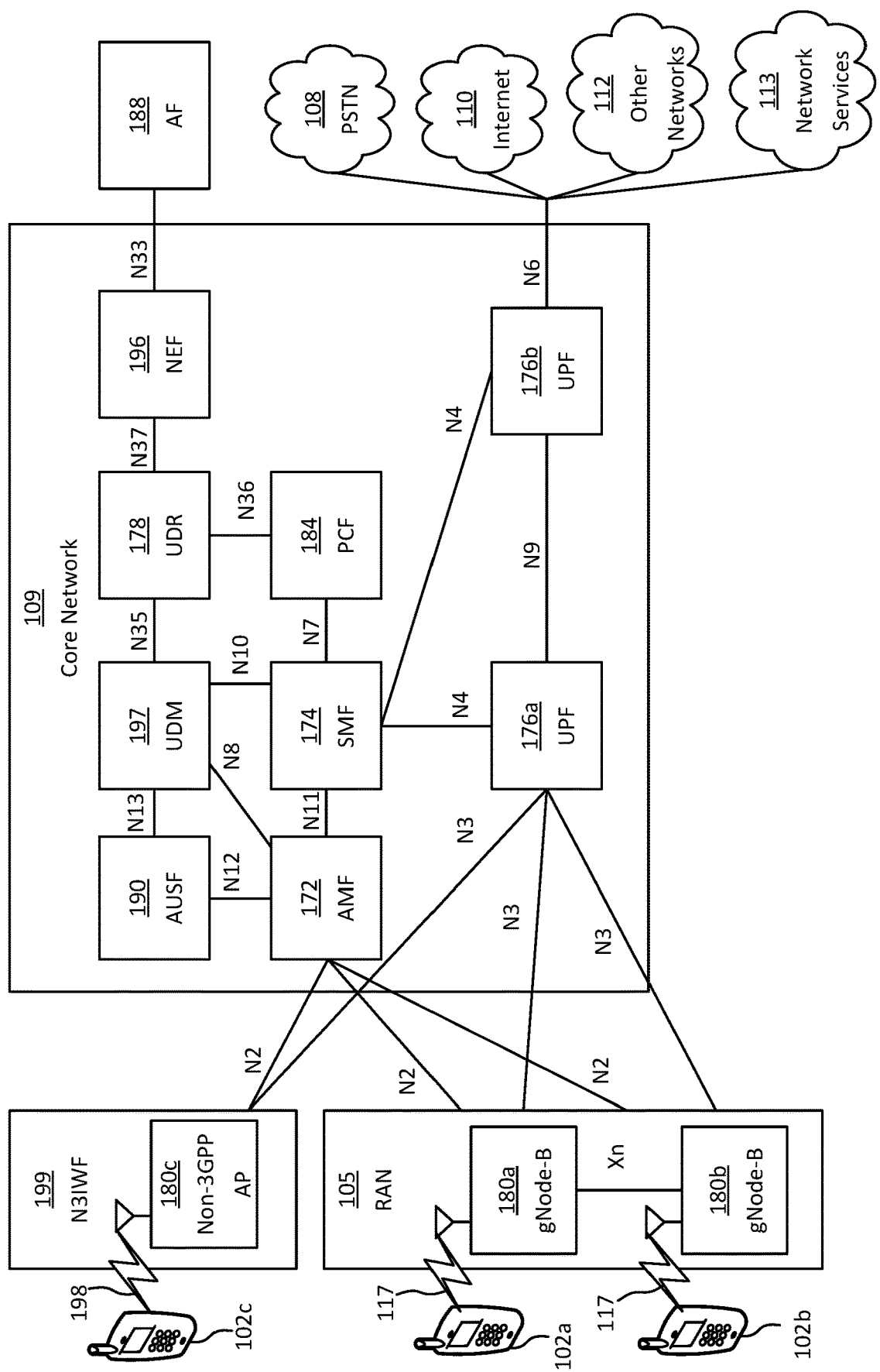
FIG. 1D illustrates a system diagram of a radio access network and a core network according to an aspect of the application.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. x1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support network slicing. Network slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
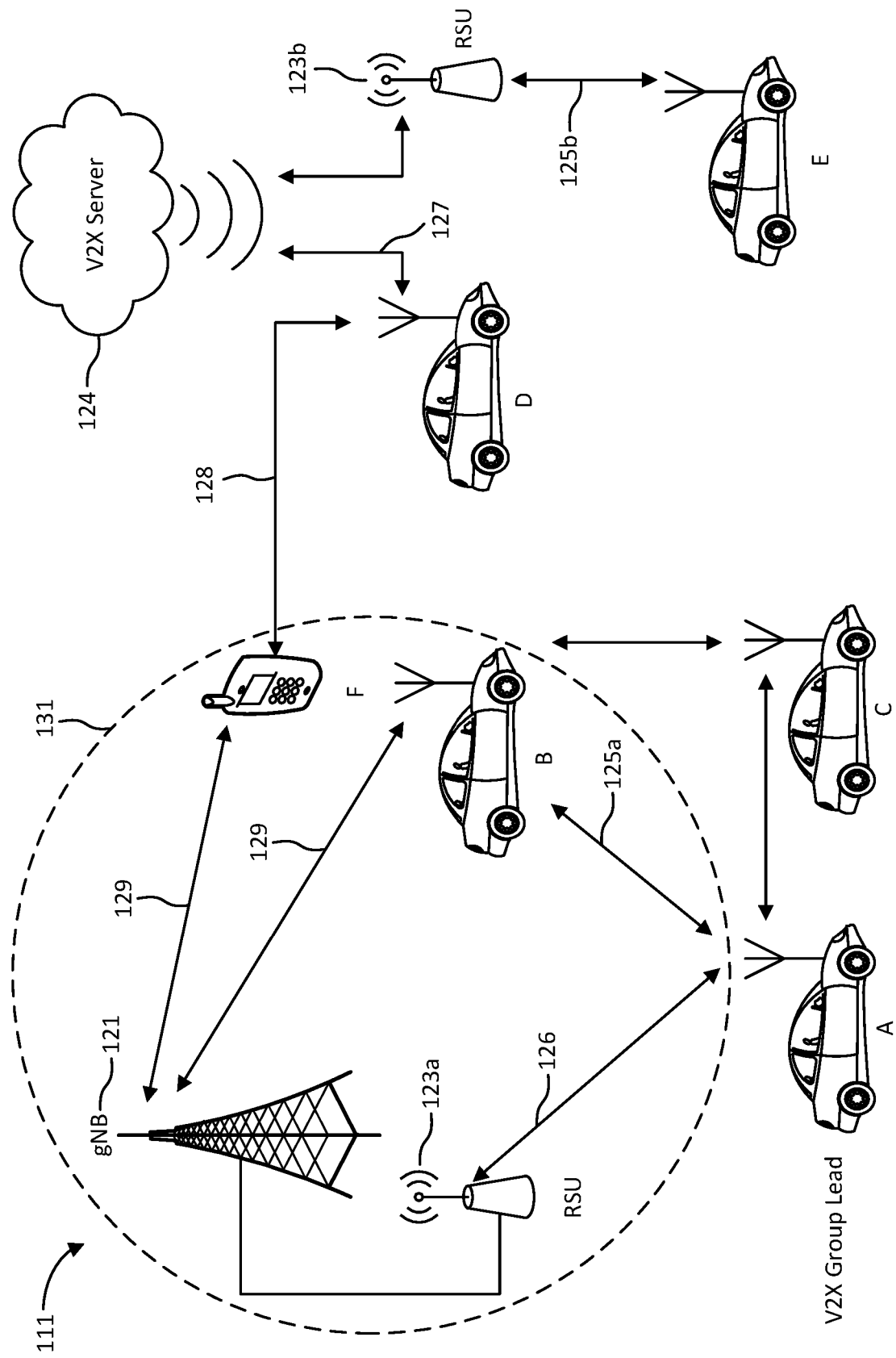
FIG. 1E illustrates a system diagram of a radio access network and a core network according to an aspect of the application.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 1E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 1E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
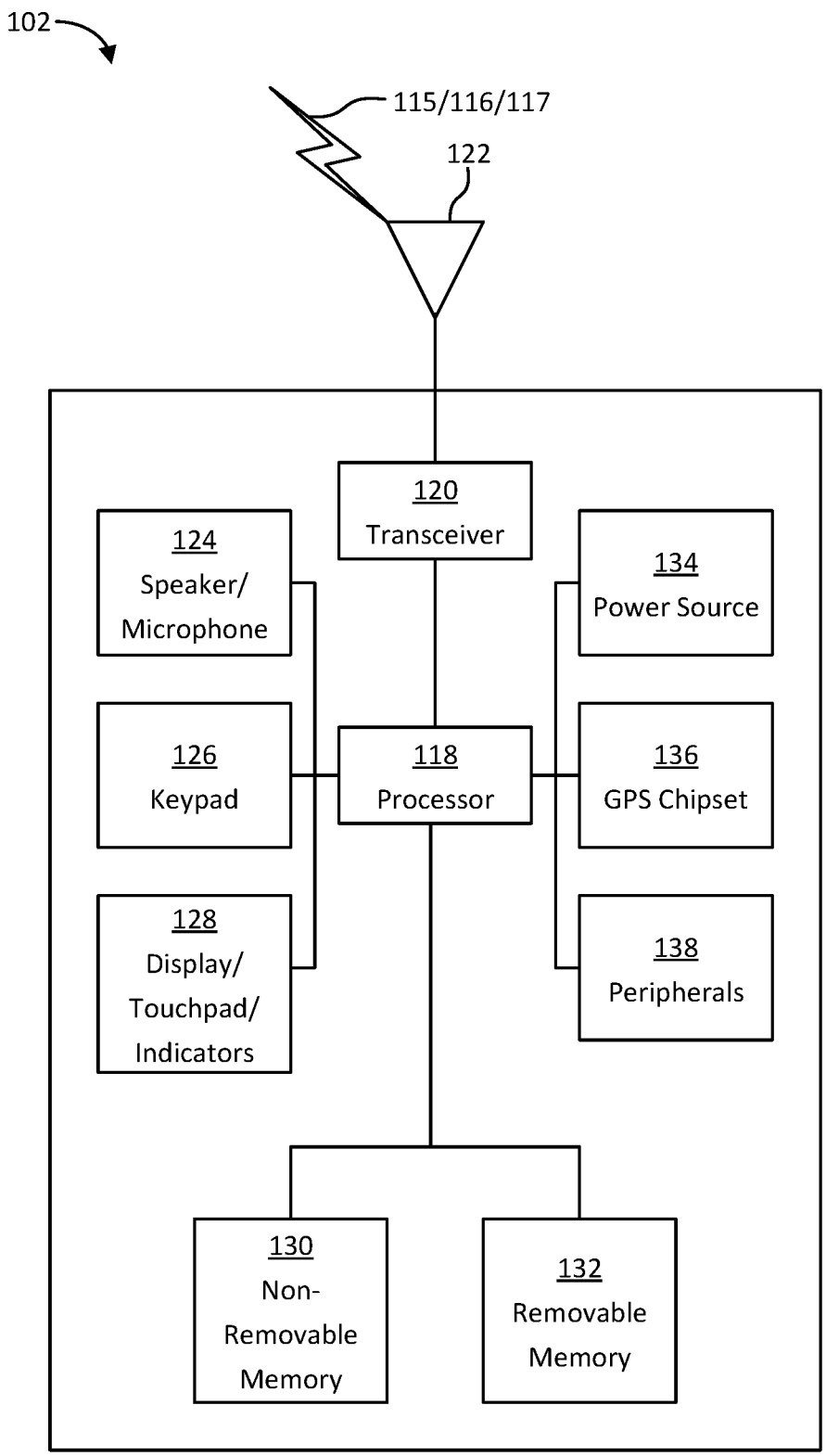
FIG. 1F illustrates a block diagram of an exemplary computing system in communication with one or more networks previously shown in FIGS. 1A, 1C, 1D and 1E according to an aspect of the application.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
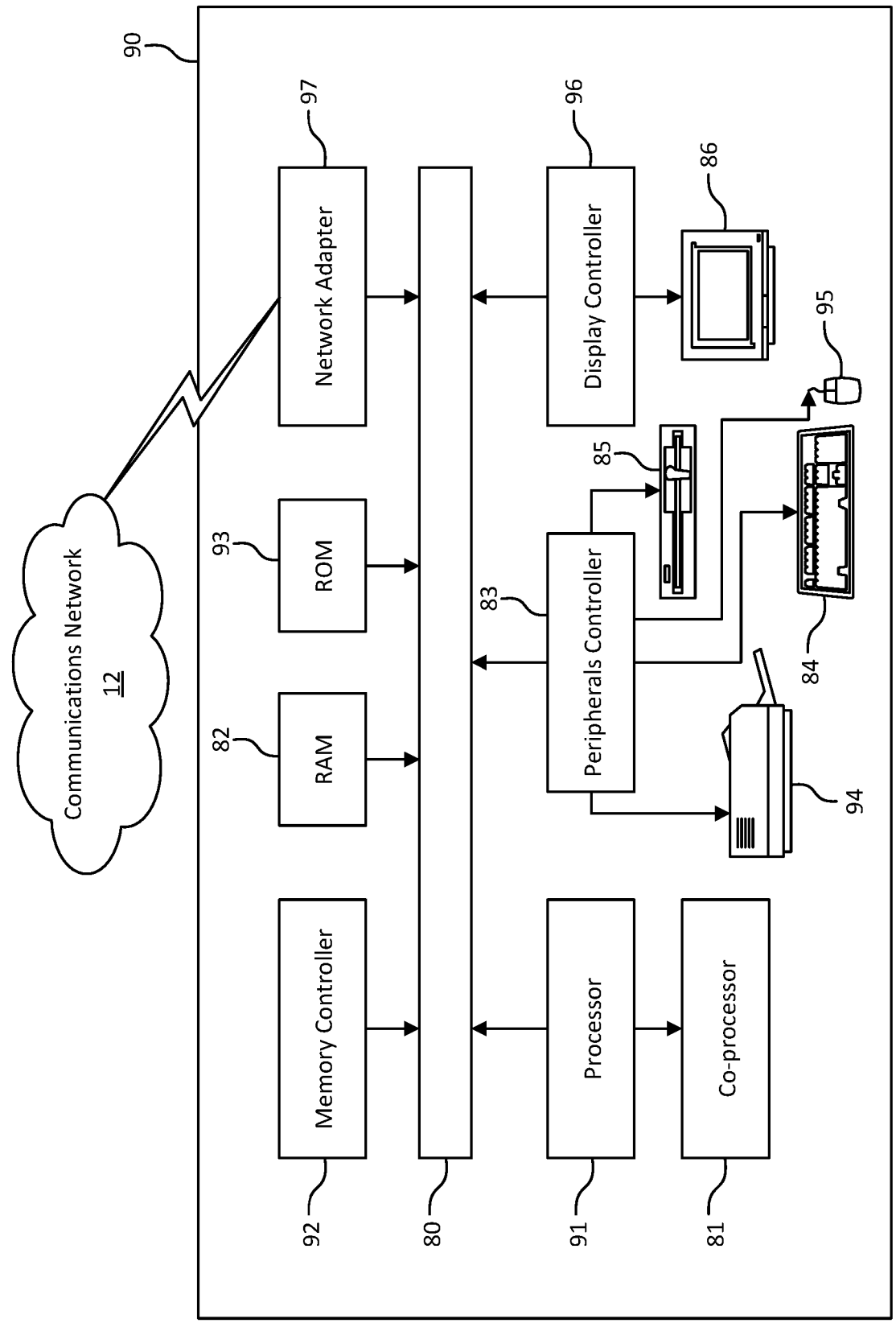
FIG. 1G illustrates an exemplary communications system according to an embodiment.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Sub-6 GHz Operation on Unlicensed Band in LTE and NR

LTE based standards enabled LTE based access into unlicensed bands in the sub-6 GHz range with the introduction of LTE-LAA. LAA enabled DL access on SCells on unlicensed-band aggregated with a license-band PCell. Further, eLAA enabled UL access and feLAA introduced autonomous UL access on unlicensed bands. New Radio (NR) introduced NR based DL and UL operation in the sub-6 GHz range and supports standalone operation in unlicensed spectrum.

Channel Sensing in LTE and NR

In the sub-6 GHz range, omni-directional or quasi-omni channel sensing is employed. When a node senses the channel and determines that the channel is idle, the node occupies the channel for a duration referred to as COT by transmitting either in an omni-directional manner or in a directional manner within that COT. After transmission is completed or a maximum channel occupancy time (MCOT) is reached, the node releases the channel so that another device may occupy it.

Figure 2A:
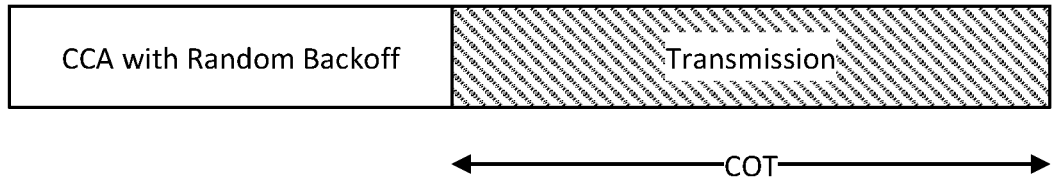
FIGS. 2A-B illustrate a LBT mechanism in LTE and NR CAT4 and CAT2, respectively, in shared COT according to an aspect of the application.
Figure 2B:
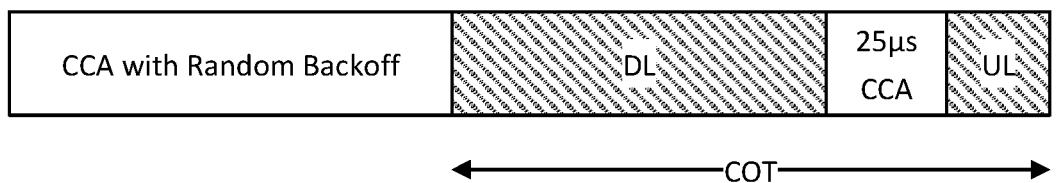

A node may also allow another node to occupy its acquired channel through a mechanism called COT-sharing. Here, one node gains channel access through a CAT4 LBT procedure and enables a second node to use part of its COT without channel sensing such as with CAT1 procedure or with short duration sensing (25 μs) such as a CAT2 LBT procedure. FIG. 2A illustrates COT acquisition following CAT4 LBT. FIG. 2B illustrates CAT2 LBT and UL transmissions by the UE in a gNB acquired COT.

Subband Aggregation in Sub-6 GHz Unlicensed Spectrum

It is desirable to aggregate multiple adjacent subbands in a single wide band carrier to improve spectrum utilization by using spectrum which is otherwise allocated as guard band between the subbands. This provides improvements over carrier aggregation. In sub-6 GHz, 10 MHz or 20 MHz subbands may be composited into a single carrier. In a given channel access opportunity, the number of available subbands typically varies. So, a device obtains a COT over certain subbands in a channel access opportunity and may indicate the status of its COT and subbands to devices in its network. In NR-U Rel. 16, such an indication can occur explicitly in a group cast manner through control signaling.

WiGiG

IEEE 802.11ad and 802.11ay standards enable WiFi-like communications in the mmW range. The PCP/AP and STA perform CSMA/CA for channel access during contention based access periods. They support physical carrier sensing, a functionality provided by the physical layer through energy or preamble detection and virtual carrier sensing, a functionality provided by the MAC layer through a RTS/CTS protocol and timer mechanism using the network allocation vector (NAV) timer. The NAV field in the MAC header of the RTS and CTS messages indicates, in microseconds, how long the channel is reserved by another station. During the time of the timer, the channel is considered busy. Thus, virtual carrier-sensing limits the need for physical carrier-sensing to save power.

NR Operation in mmWave Spectrum

The 37 GHz and 60 GHz frequency bands are good candidates for unlicensed operation of cellular technologies in the mmW range. These spectra offer very large bandwidths are attractive options for a variety of use cases such as eMBB, mobile data offloading, backhaul, short range D2D, enterprise, private networks, etc. The frequencies support high antenna directivity and beamforming. However, the spectra pose many challenges—with wavelengths in the mmW range, high path loss and oxygen absorption provide limited coverage, in the range of a few hundred meters. Communication in these bands is mainly characterized by LOS transmissions and directly reflected paths.

Typical use cases identified for operation in these bands include eMBB, data off loading, backhaul, factory applications, virtual networks, augmented reality/virtual reality, redundant network application, IIoT, etc. Targeted deployment scenarios include indoor hotspots, dense urban, urban micro/macro, rural, factory, indoor D2D.

TRP and Multi-Panel Transmissions

It is expected that operation in the mmW range will be through phased array antennas and massive MIMO, thereby providing beamforming between the transmitter to the receiver. The beams are expected to be highly directional for achieving sufficiently high SINR and range. It is also expected that multiple beams will be deployed in a typical network to ensure reliability and overcome blockage.

Figure 3A:
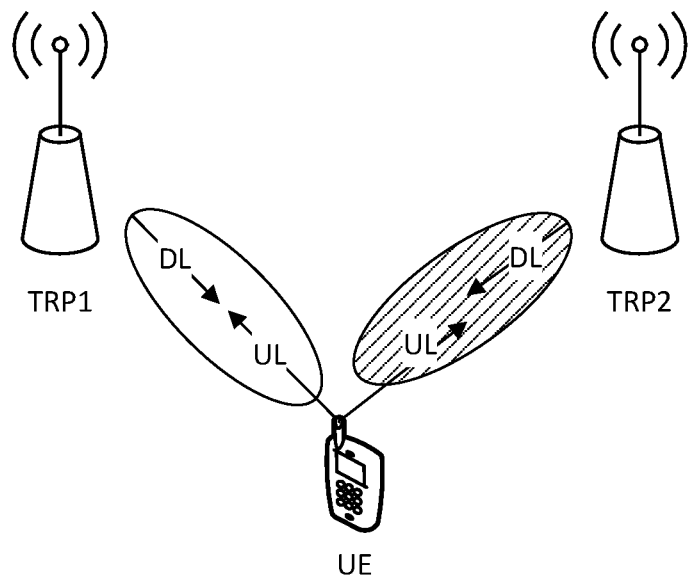
FIGS. 3A-B illustrate Multi-TRP transmission and Multi-panel transmission, respectively, according to an aspect of the application.

Multiple TRPs may be deployed to provide good spatial coverage. An example of multi-TRP communication is shown in FIG. 3A. With ideal backhaul such as point-to-point connection using optical fiber, the TRPs can be connected with very high throughput and very low latency. With non-ideal backhaul such as mmW communication, microwave, and relay networks there can be noticeable delay between the TRPs.

Figure 3B:
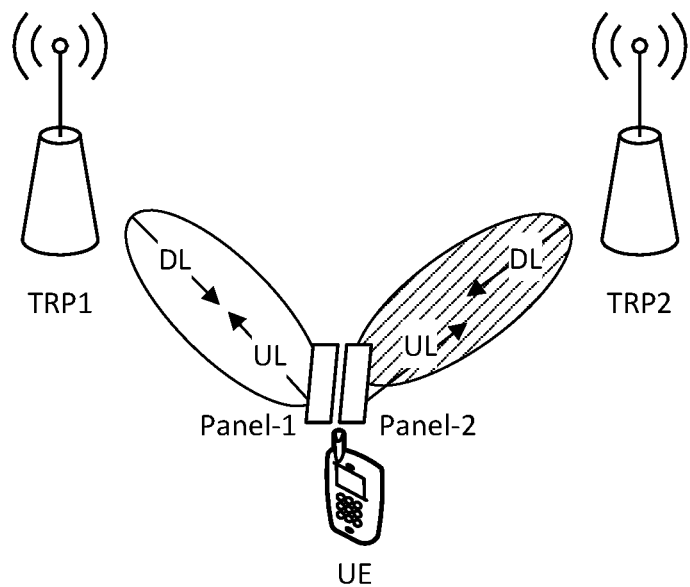

A UE may also be equipped with multiple panels so that it can beamform in multiple directions simultaneously. An example of multi-panel UE communication is shown in FIG. 3B.

Omni Vs. Directional Sensing

Figure 4A:
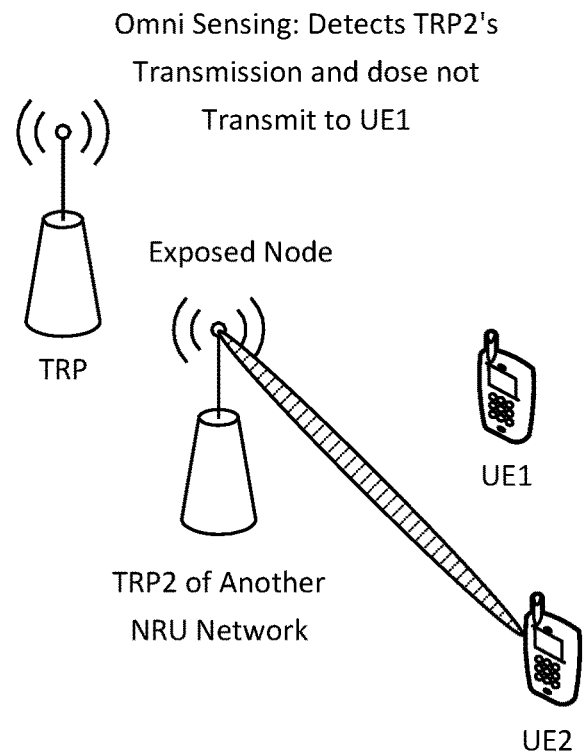
FIGS. 4A-C illustrate exposed nodes and omni-sensing, spatial reuse, and hidden nodes and directional sensing, respectively, in accordance with an aspect of the application.

Omni or quasi-omni sensing checks for channel availability in the spatial domain, i.e., if the channel is clear in omni or quasi-omni space, the channel is considered idle. This is the typical mode of sensing in the sub-6 GHz range. A device using omni or quasi-omni sensing may perform only directional transmissions and not fully require the spatial channel at a given time. This can limit spatial reuse resulting in exposed nodes causing under-utilization of the channel. For example, a non-ideal backhaul network is shown in FIG. 4A. Here, the nodes perform omni sensing; so, TRP2 senses TRP1's transmission to UE1 and does not transmit to UE2. Thus, a UE may be capable of receiving from multiple TRPs simultaneously through spatial discrimination but the sensing mechanism may limit the simultaneous transmissions to the UE.

Another short-coming of omni or quasi-omni sensing is the limited range of sensing compared to the directivity of the transmissions. Thus, the transmitter using omni or quasi-omni sensing may not have a good picture of the environment of the receiver.

Figure 4B:
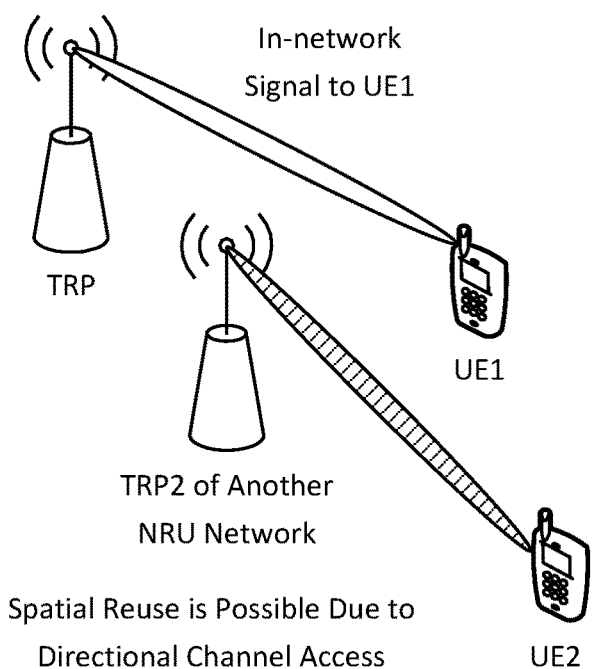

This makes directional sensing more attractive. With this mechanism, multiple independent links can operate simultaneously in different spatial directions as shown in FIG. 4B, where TRP1-UE1 link and TRP2-UE2 link operate in the same time and frequency resources but do not interfere with each other as their channels are separated in space. Directional sensing is performed by using a spatial domain filter with certain characteristics in space such as angular spread, orientation in the azimuth and elevation and gain. The directionality and steering of the beam is obtained through analog (such as phased array) beamforming or digital beamforming or a combination of both.

Figure 4C:
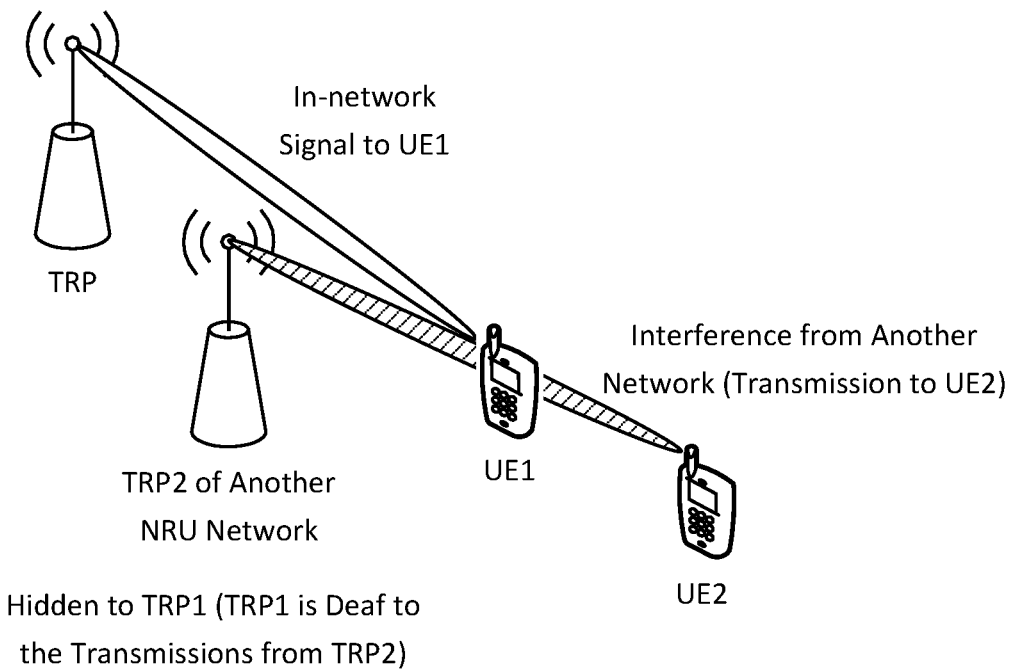

However, directional sensing gives rise to the "hidden nodes" problem as the transmitter can be deaf about the receiver's environment. In FIG. 4C, TRP1 performs directional sensing and transmits to UE1. TRP2 also does directional sensing and finds a clear channel but its transmission to UE2 interferes with UE1. So, TRP2 is a hidden node for the TRP1-UE1 link.

Acquiring a Channel with Directionality

To acquire a channel with directionality, a node must select an appropriate spatial domain filter to perform channel sensing or LBT. The choice of the spatial filter may depend on the network characteristics such as traffic load, density of nodes, existence of other co-channel networks and technologies, spatial orientation of intended recipients, type and amount of control and data to be transmitted. By managing channel access of nodes through appropriate spatial filters, different spatial reuse factors may be realized and throughput boosted in an unlicensed deployment.

Since influencing factors can change over time, multiple spatial filters for LBT may be supported. A node may change the spatial filter for LBT to achieve a target spatial reuse or in response to changes in the network.

In general, when a node performs LBT with a spatial domain filter L to gain channel access, it may transmit data with a set of spatial filters {Di} such that one or more of the following characteristics are satisfied. The angular spread of the main lobe generated by Di ∀i (for all integer values of i) is spatially contained within the main lobe of L in both azimuth and elevation. This may be evaluated in terms of the angular spread of a beam. The angular spread of Di does not exceed that of L.

Figure 5:
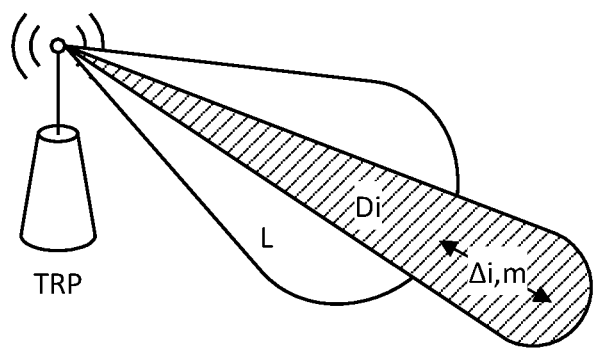
FIG. 5 illustrates spatial filters providing wide and narrow beam patterns with angular spread of Di contained with that of L in accordance with an aspect of the application.

The peak power in the main lobe generated by Di ∀i is offset by $\Delta i,m$ dB with respect to the peak power in the main lobe of L. FIG. 5 shows a TRP generating a wider beam using spatial filter L and a narrow beam using spatial filter Di such that the narrower beam's angular spread is contained within that of L. The peak of the narrow beam is higher than the peak of the wide beam by $\Delta i,m$ as the narrow beam has higher directivity. The average power in the side lobes generated by Di ∀i is offset by $\Delta i,s$ dB with respect to the average power in the side lobes of L. The relative power in the side lobes generated by Di ∀i is offset by $\Delta i,r$ dB with respect to the power in the main lobe of L. If L is an omni or quasi-omni filter, {Di} could include beams in every possible spatial direction. The power constraints applied through $\Delta i,m$ or $\Delta i,s$ or $\Delta i,r$ ensure that highly directional transmission beams that have significantly higher range than L can be handled differently.

Once the device obtains channel access using spatial filter L, it can transmit on directional beams Di, potentially with longer range than that of filter L. Transmissions using Di may cause interference with another node since it is possible sensing with L does not sense the environment of the receiver. This is because the range of L is typically shorter than the range of Di. To solve deafness of the transmitter, a 2-way exchange of messages is proposed between the transmitter and receiver to ensure the channel is idle for both nodes. As a result, the transmitter may transmit a CAI-T to the intended receiver(s). The receiver responds with a CAI-R to the transmitter. On receiving the CAI-R indicating the environment at the receiver is clear to receive, the transmitter may transmit control and data signals to the receiver and/or additional information indicating channel reservation. The exchange of CAI-T and CAI-R may serve as a handshake between the devices prior to, at the start, to the COT of the transmitter. Henceforth, we refer to the handshake procedure using CAI-T and CAI-R as FBLBT. We also refer to the COT obtained using a directional filter as a "directional COT."

Procedure for Channel Access

Figure 6A:
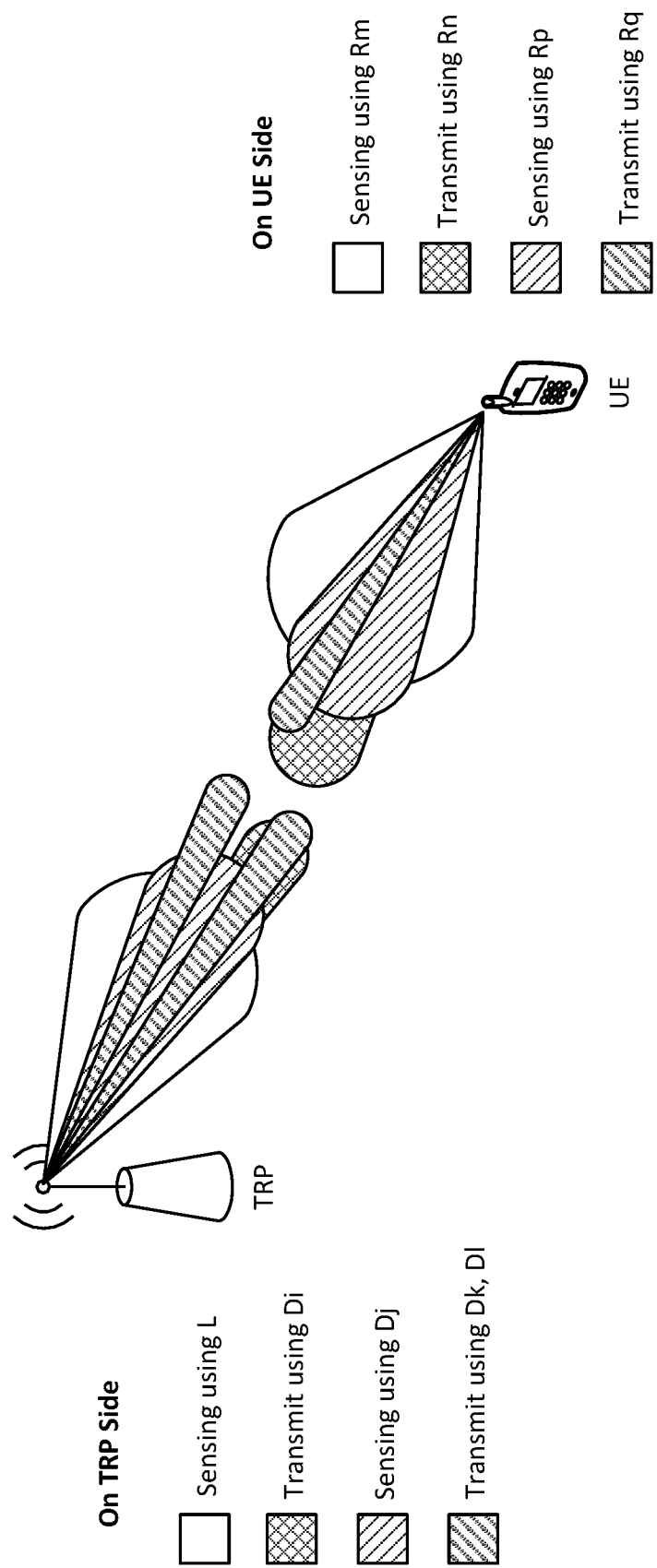
FIGS. 6A-B illustrate procedures for performing LBT and channel access with spatial filter L—FBLBT signaling between gNB and UE, and Transmission spatial filter containment within LBT spatial filter containment signaling between gNB and UE, respectively, in accordance with an aspect of the application.

According to another aspect of the application, described below are channel access procedures where a gNB attempts channel access to communicate with a UE. As shown in FIG. 6A, the TRP and UE communicate using different spatial filters at different stages of the channel access and transmission procedure. The overlapped beams conceptually indicate the angular spread of a transmit beam is contained within that of the LBT beam in a given COT. The ranges and SINR of the LBT and transmit beams can be different depending on the extent of co-phasing of the antenna array elements.

Figure 6B:
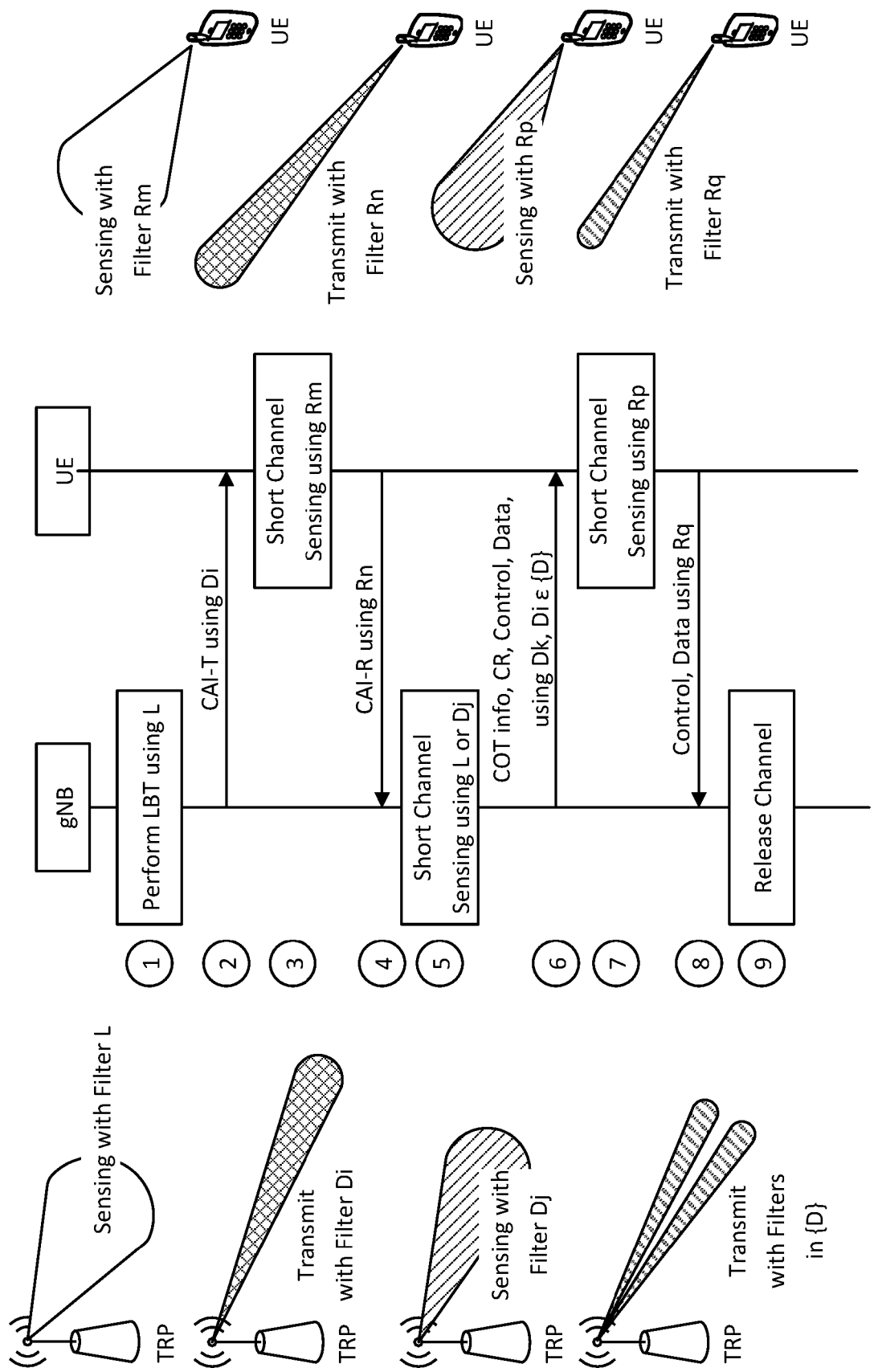

The following steps are described in reference to FIG. 6B. The beams used at different stages are also shown and can be correlated with those in FIG. 6A.

1. The gNB selects a spatial filter L for performing LBT from a set {F} of possible LBT spatial filters. The gNB performs channel sensing with filter L. This may be a random backoff within a contention window, similar to CAT4 LBT with certain channel access priority class. For example, this may apply to the load-based-equipment (LBE) mode of operation. Alternatively, the channel sensing may be similar to CAT2 LBT with a fixed period for sensing. For example, this may apply to sensing in the idle period prior to the fixed frame period (FFP) in the frame-based-equipment (FBE) mode of operation.

2. On detecting an idle channel, the gNB obtains the directional COT in the direction of spatial filter L. Once obtained through LBT filter L, the gNB may operate in this COT with a set of spatial filters {D} (e.g., for transmission, reception and sensing) satisfying the requirements to operate on the channel. {D} may also include the spatial filter L. During the COT, the gNB may sense or transmit using the spatial filters in {D}. The gNB transmits the CAI-T to the UE using spatial filter Di∈{D} (Di belongs to the set {D}). In general, the gNB may transmit the CAI-T on multiple beams using multiple filters from {D}. This may be useful to address multiple UEs simultaneously on different beams within the same COT.

3. Subsequently or concurrently, the UE selects spatial filter Rm and performs short channel sensing such as CAT2 based sensing. Rm∈{R}, where {R} is the set of spatial filters that may be used in response to the CAI-T transmitted on the shared COT obtained with LBT spatial filter L. Rm may also be dependent on the spatial filter Rn which will be used to transmit the CAI-R in the next step.

4. Upon determining the channel to be clear, the UE sends the CAI-R on Rn indicating it is ready to receive signals from the gNB. The UE may set Rm=Rn. In other words, the UE may sense with the same filter used to transmit to the gNB to reduce the burden of sensing on the UE.

5. The gNB senses the channel using short duration sensing such as CAT2 sensing using one or more spatial filters Dj, where Dj∈{D}.

6. On finding the channel to be clear, the gNB transmits one or more of COT information, control information, data, and channel reservation (CR) signaling using one or more spatial filters in {D}. In this example, the gNB transmits on two beams Dk, Dl. The channel reservation signal may itself carry the COT information including intended time of channel occupation, subbands of channel occupation and spatial information on channel occupation.

7. The UE receives these signals. In an embodiment where the UE has to send a response, the UE senses with spatial filter Rp∈{R} for short duration sensing, e.g., CAT2 LBT. The selection of a suitable spatial filter Rp may depend on the spatial filter Rq employed by the UE to transmit back to the gNB.

8. On finding the channel to be clear, the UE transmits data and/or control information using spatial filter Rq.

9. Once the communication is complete, the gNB releases the channel by stopping transmission on it.

According to the above-described embodiment, the TRP performs channel access and shares the information it with the UE. However, it is envisaged that the UE may initiate a COT and share its information with the TRP or another UE on the sidelink.

Figure 7:
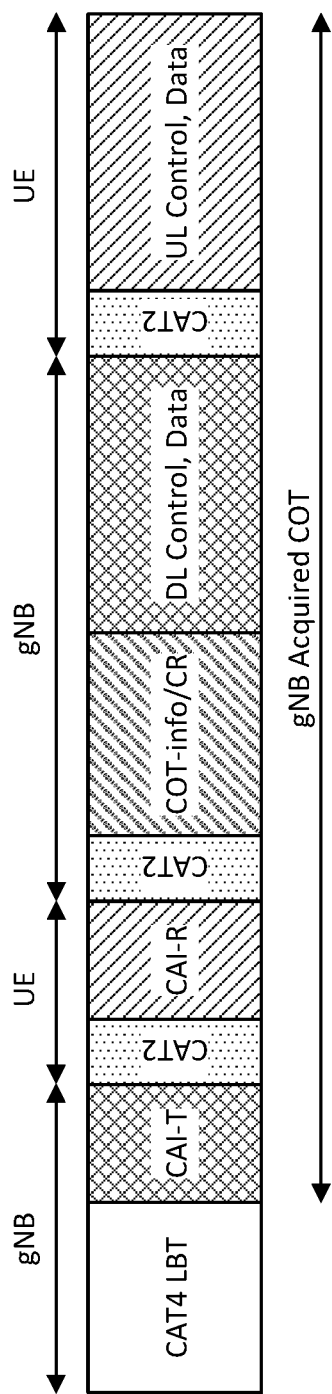
FIG. 7 illustrates an timeline showing gNB acquired COT using direction LBT-FBLBT in accordance with an aspect of the application.
Figure 8:
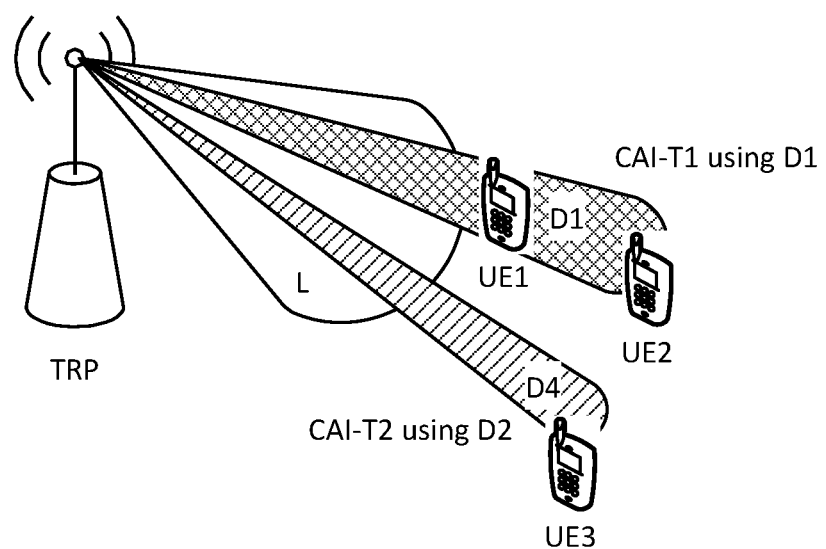
FIG. 8 illustrates a configuration where CAI-T is transmitted to multiple UEs in a COT in accordance with an aspect of the application.

The timeline for channel sensing, handshake and transmission between the gNB and the UE in the gNB acquired COT is shown in FIG. 7. In general, when the node (TRP in example of FIG. 6A) gets channel access after performing LBT with spatial filter L, it may transmit CAI-R to multiple other nodes, e.g., UE1, UE2 and UE3 as shown in FIG. 8. The TRP sends CAI-T1 to UE1 and UE2 using spatial filter D1 and CAI-T2 to UE3 using spatial filter D2. D1 and D2 satisfy the requirement for transmission within the directional COT obtained with spatial filter L.

The CAI-T1 and CAI-T2 transmissions may be transmitted in a SDM or TDM manner. The CAI-T may be transmitted as a group common control information with indication to specific UEs to respond with the CAI-R, e.g., a bit in the bitmap in the DCI may be mapped to an individual UE. And when set, the UE must send the CAI-R. Alternatively, the group common control information may be used with a CAIR-RNTI and UEs configured with that RNTI respond with the CAI-T. Alternatively, the CAI-T may be transmitted in a UE-specific manner with the UE ID such as C-RNTI.

Figure 9:
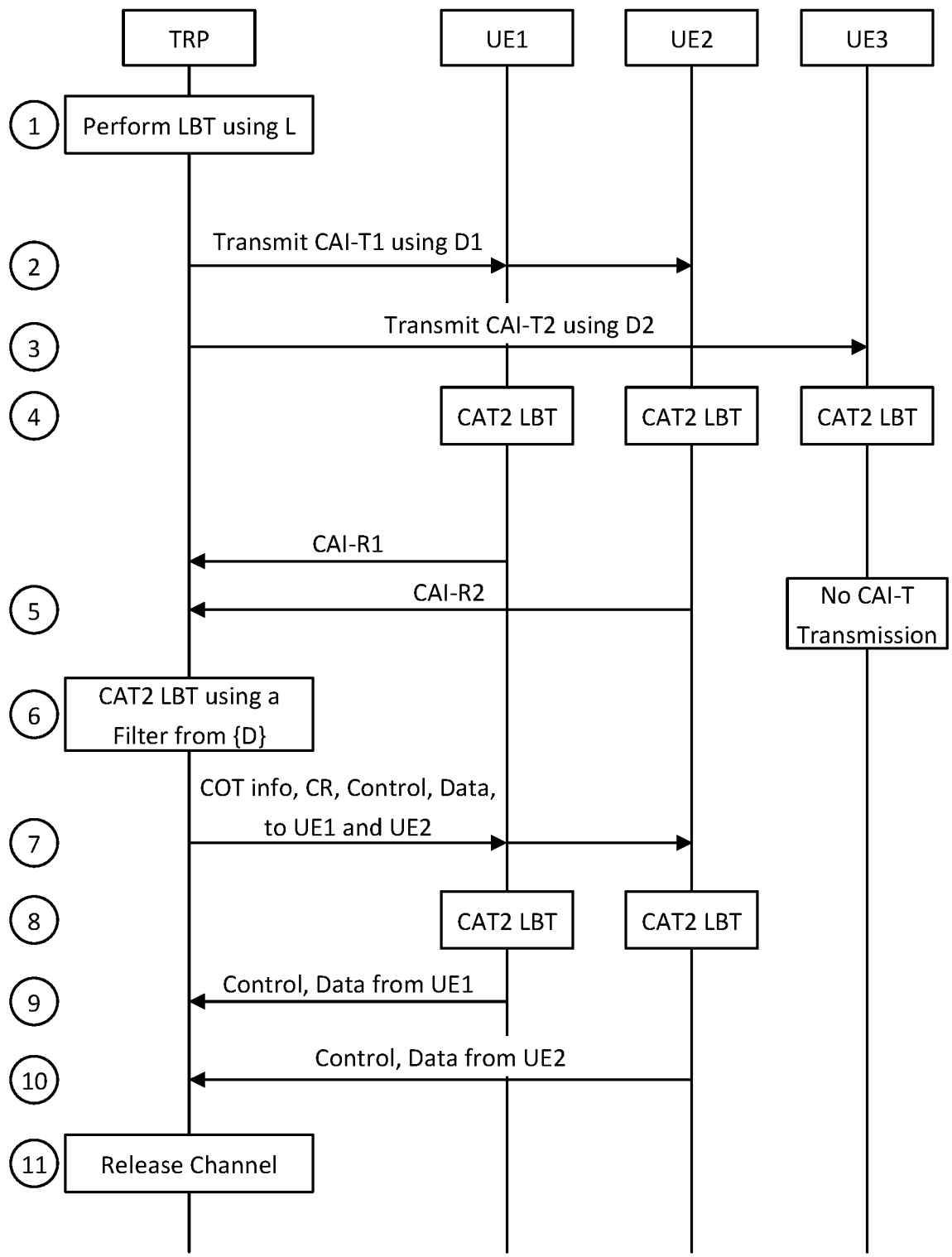
FIG. 9 illustrates signaling between TRP and UE with FBLBT scheme—gNB does not transmit data on a beam for which CAI-R is not received in accordance with an aspect of the application.

In one exemplary scenario, where the UE3 has a bad channel and does not send the CAI-R, the gNB does not transmit to UE3 in that directional COT. However, the gNB receives CAI-R1 and CAI-R2 from UE and UE2 respectively, indicating idle channel for UE1 and UE2. Therefore, the gNB does not release the COT but continues to communicate with UE1 and UE2 in the COT with appropriate beams. FIG. 9 shows an exemplary embodiment and the steps are described below.

Step-1 the TRP performs LBT using spatial filter L.
Step-2 the TRP transmits CAI-T1 using filter D1 to UE1 and UE2.
Step-3 the TRP transmits CAI-T2 using filter D2 to UE3.
Step-4 the UEs sense the channel through CAT2 LBT. The sensing from multiple UEs may occur at the same time, when the channel indicates a switch from DL to UL in the shared COT.
Step-5, UE1 and UE2 transmit CAI-R1 and CAI-R2, respectively (which may be TDM or FDM or SDM or CDM). UE3 does not transmit CAI-R3. If the CAI-R are in the form of PRACH resources, all UEs may transmits them on the same time-frequency resources.
Step-6, the gNB performs CAT2 sensing and in step-7 the gNB transmits COT information, reservation signal, control and data to UE1 and UE2.
Step-8 and step-9, UE1 senses the channel and transmits to the gNB.
Step-8 and step-10, UE2 senses the channel and transmits to the gNB.
Step-11, the gNB releases the channel.

Figure 10:
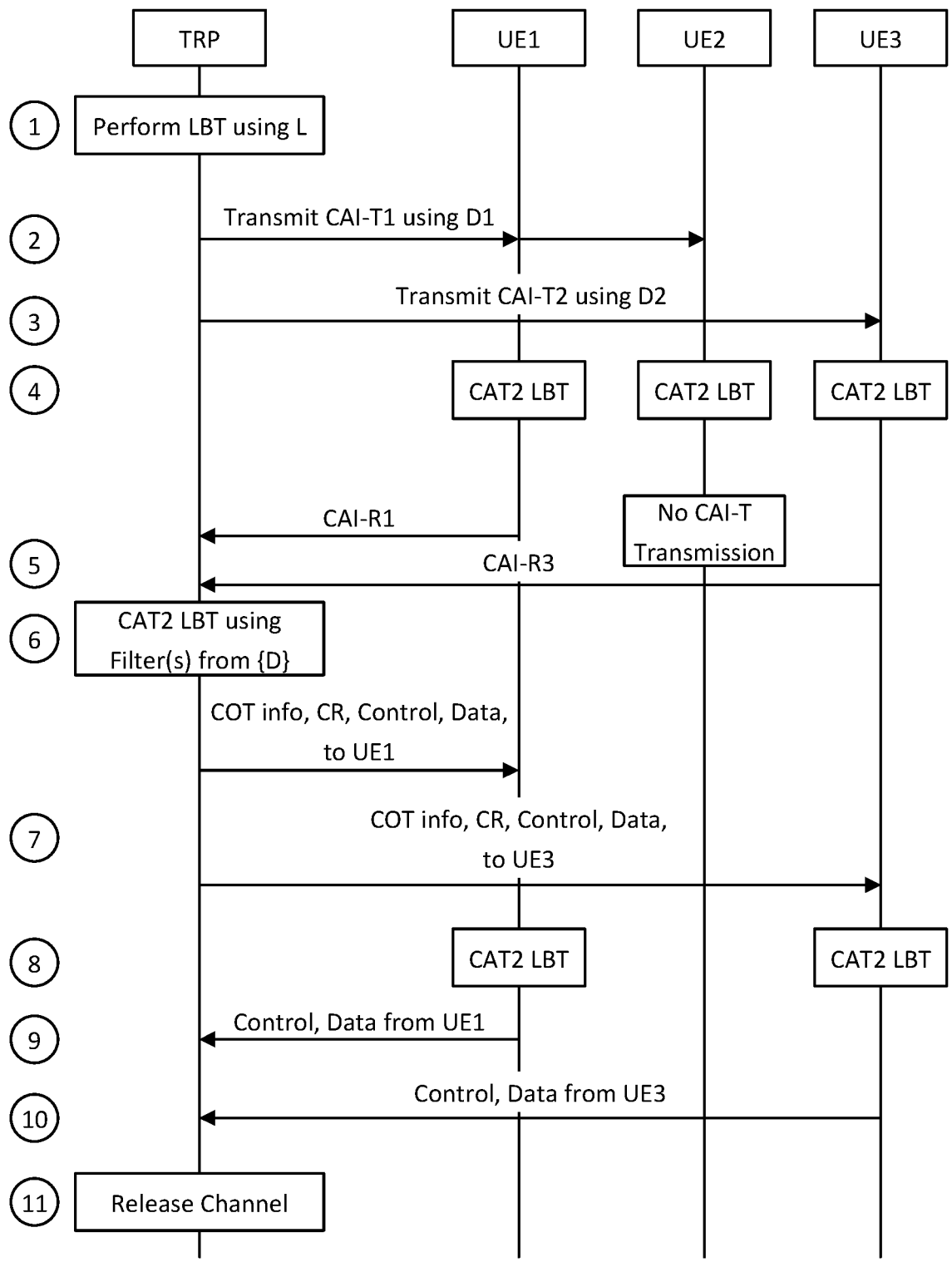
FIG. 10 illustrates signaling between TRP and UE with FBLBT scheme—gNB receives CAI-R only from UE1 on D1 and gNB does not data transmit to UE2 in accordance with an aspect of the application.

In an alternative embodiment, the gNB may resend the CAI-T2 to UE3 again in the same COT to see if the channel is available to UE3. In yet another embodiment, UE1 sends CAI-R1 indicating an idle channel, and UE2 experiences interference and does not send CAI-R2. In this case, the gNB determines that any transmission to UE1 may cause interference to the hidden nodes. So, the gNB does not transmit on Dl. FIG. 10 shows an exemplary embodiment with signaling. The steps are described below.

Step-1 the TRP performs LBT using spatial filter L.
Step-2 the TRP transmits CAI-T1 using filter D1 to UE1 and UE2.
Step-3 the TRP transmits CAI-T2 using filter D2 to UE3.
Step-4 the UEs sense the channel through CAT2 LBT.
Step-5, UE1 and UE3 transmits CAI-R1 and CAI-R3. UE2 does not transmit CAI-R2.
Step-6 the gNB senses the channel and in step-7 transmits to UE1 and UE3 on appropriate beams Step-8, DL-UL switch occurs in the gNB's shared COT; UE1 and UE3 sense the channel.
Step-9 and step-10, they transmit to the gNB.
Step-11, the gNB releases the channel.

Figure 11:
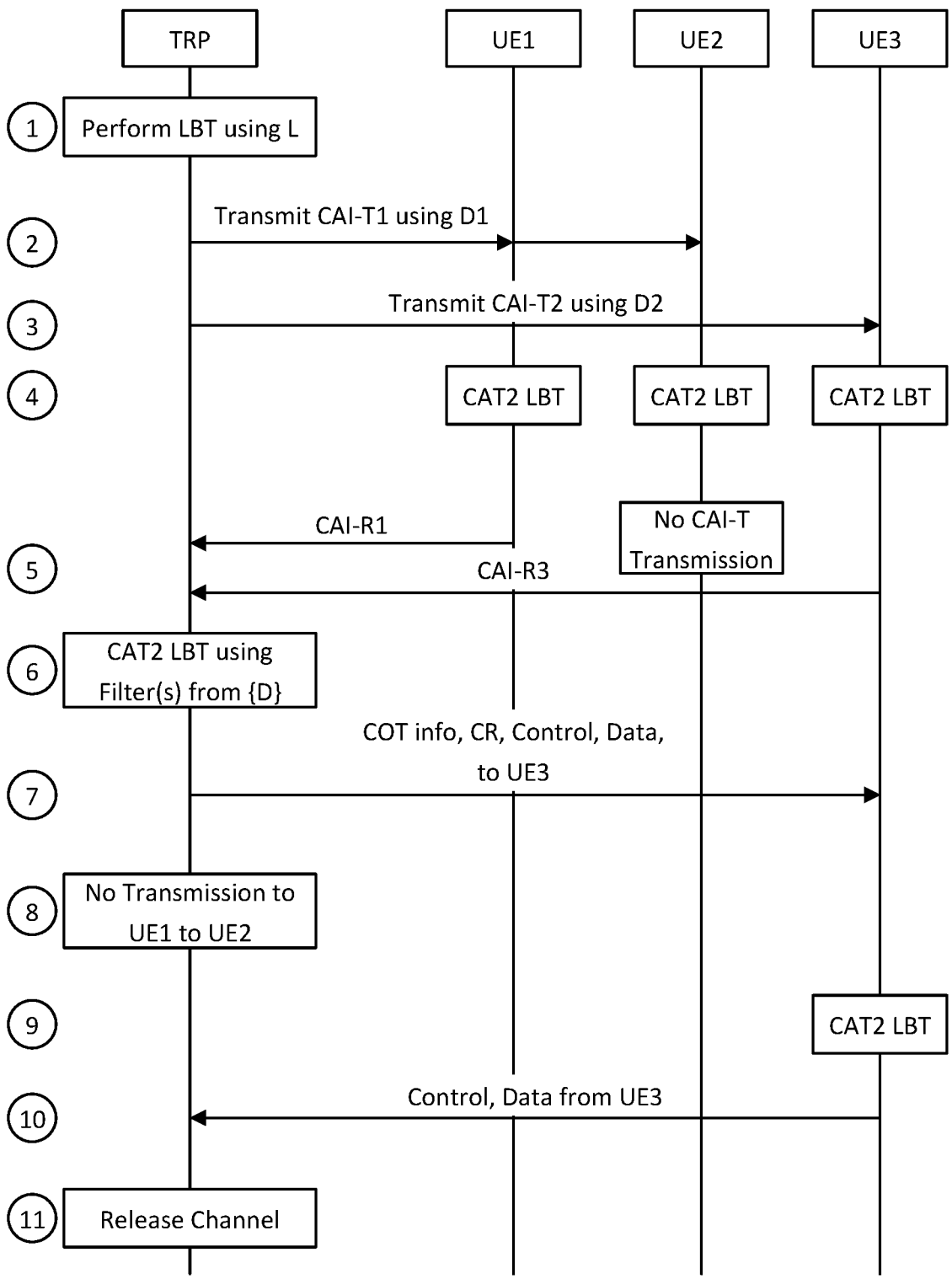
FIG. 11 illustrates signaling between TRP and UE with FBLBT scheme—gNB does not transmit in a direction if even one UE does not send a CAI-R in accordance with an aspect of the application.

In another embodiment, the gNB does not transmit to UE2 and determines a beam to transmit to UE1. FIG. 11 shows the exemplary signaling for this case. The steps are described below.

Step-1 the TRP performs LBT using spatial filter L.
Step-2 the TRP transmits CAI-T1 using filter D1 to UE1 and UE2.
Step-3 the TRP transmits CAI-T2 using filter D2 to UE3.
Step-4 the UEs sense the channel through CAT2 LBT.
Step-5, UE1 and UE3 transmits CAI-R1 and CAI-R3. UE2 does not transmit CAI-R2.
Step-6 the gNB senses the channel and in step-7 transmits to UE3 on an appropriate beam.
Step-8, the gNB does not transmit to UE1 and UE2.
Step-9 the DL-UL switch occurs in the gNB's shared COT; so UE3 senses the channel and in step-10, the UE3 transmits to the gNB
Step-11, the gNB releases the channel.

CAI-T and CAI-R Signaling

The CAI-T may indicate the following information:
A. The spatial filter L that determines the spatial dimensions of the directional COT;
B. The subbands over which the gNB has a clear channel;
C. The subbands over which the UE must report interference levels in the CAI-R;
D. The spatial filter(s) the UE must use to perform its LBT;
E. The identity of the transmitter;
F. The identity of the intended recipients; and
G. Possible duration of the COT if the handshake is successful;

The CAI-R may indicate the following information:
A. The interference levels for one or more subbands in a directional COT;
B. The spatial filter Rm used for the LBT. This may be indicated as a correspondence to an RS transmitted by the transmitter (gNB) or a QCL RS transmitted by the receiver (UE); and
C. COT of interference if known to the UE—if the UE can detect the duration of occupation of the interfering node (such as the NAV of a WiGiG node), for example through virtual sensing, the UE may indicate this information in the CAI-R.

Figure 12:
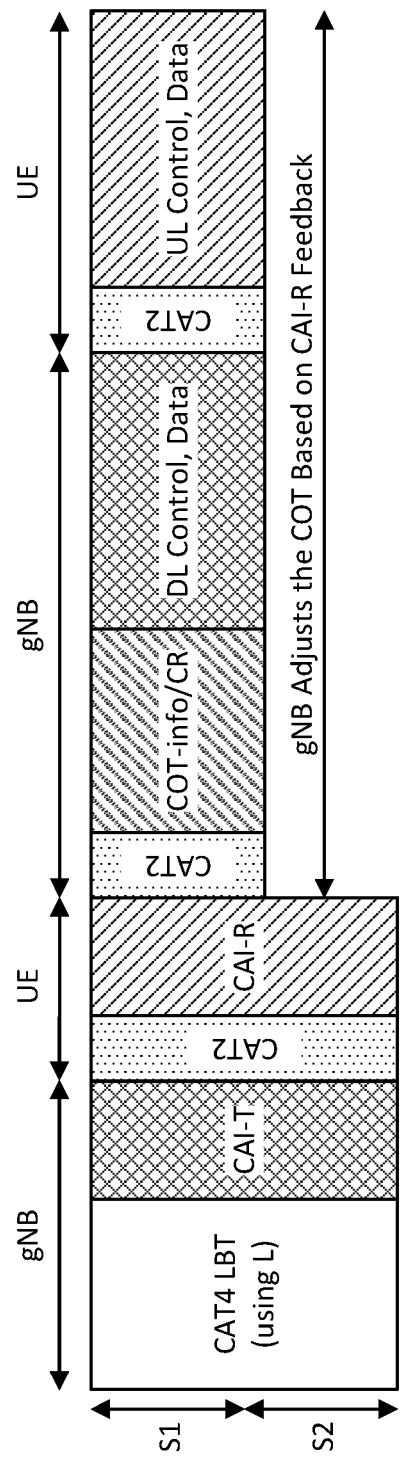
FIG. 12 illustrates gNB drops S2 from its COT when CAI-R indicates busy channel for the UE in accordance with an aspect of the application.

The gNB may adjust its LBT subbands or filter(s) depending on the received CAI-R. In FIG. 12 the gNB receives a CAI-R indicating that the UE's channel is idle in S1 while its interference is high in S2. So, the gNB senses only S1 and obtains COT in S1.

Based on the receiver's (UE in this example) response, the transmitter (gNB in this example) may perform one of the following actions:
A. If the RS for the CAI-R such as the DMRS is detected but the CAI-R is not detected, the gNB assumes that the UE received the CAI-T but does not have a clear channel.
B. If the RS for the CAI-R such as the DMRS cannot be detected, the gNB assumes that CAI-T was not received by the UE or the UE does not have a clear channel.
C. If the CAI-R is received and indicates interference levels above a threshold Sthresh dBm for one or more subbands, the gNB will release the channel in those subbands in that directional COT (in this example direction of LBT filter L). Note that, the CAI-R may be transmitted after LBT with less stringent energy detection threshold; and CAI-R may be received despite the interference considering the wideband channel and large number of available resources for CAI-R.

Figure 13A:
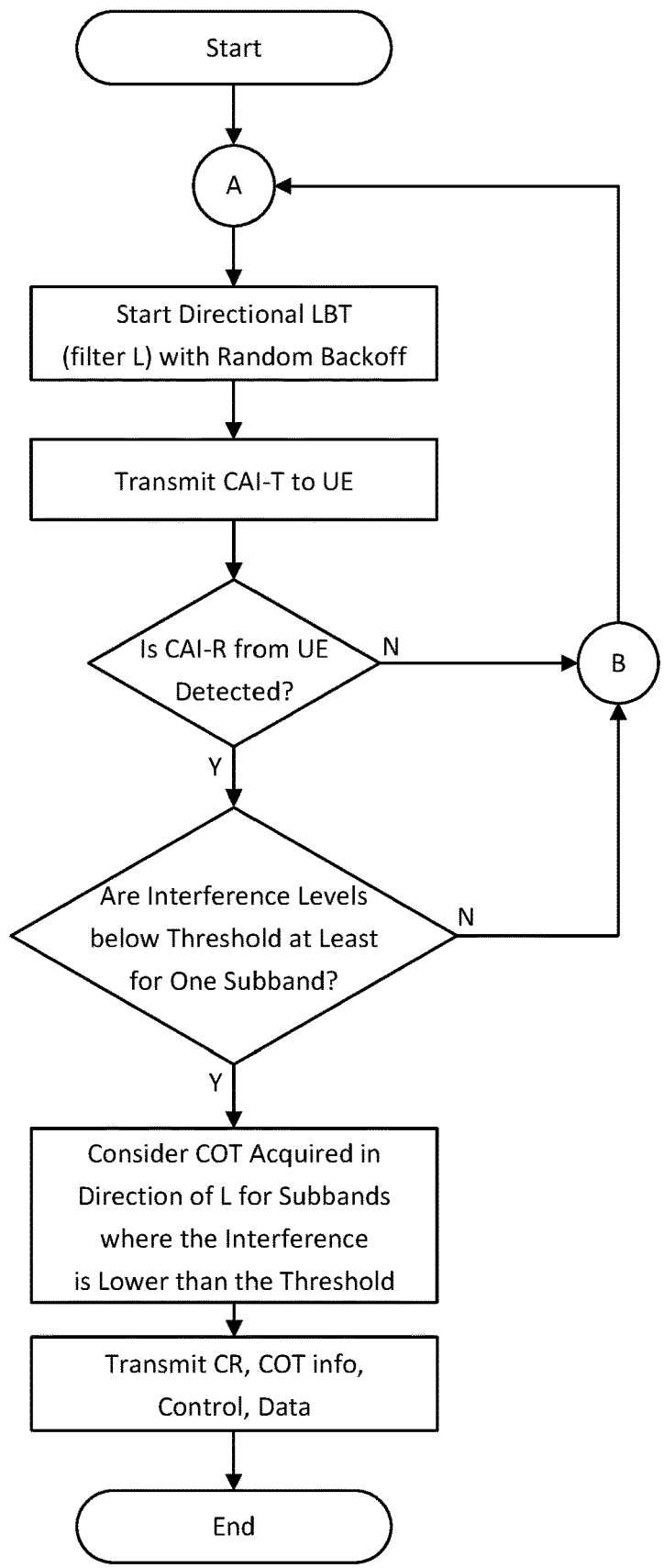
FIGS. 13A-B illustrate procedures when CAI-R indicates a busy channel at the UE when CAT4 LBT is repeated if CAI-R indicates busy channel, and when CAI-R is retransmitted if CAI-R indicates busy channel, respectively, in accordance with an aspect of the application.
Figure 13B:
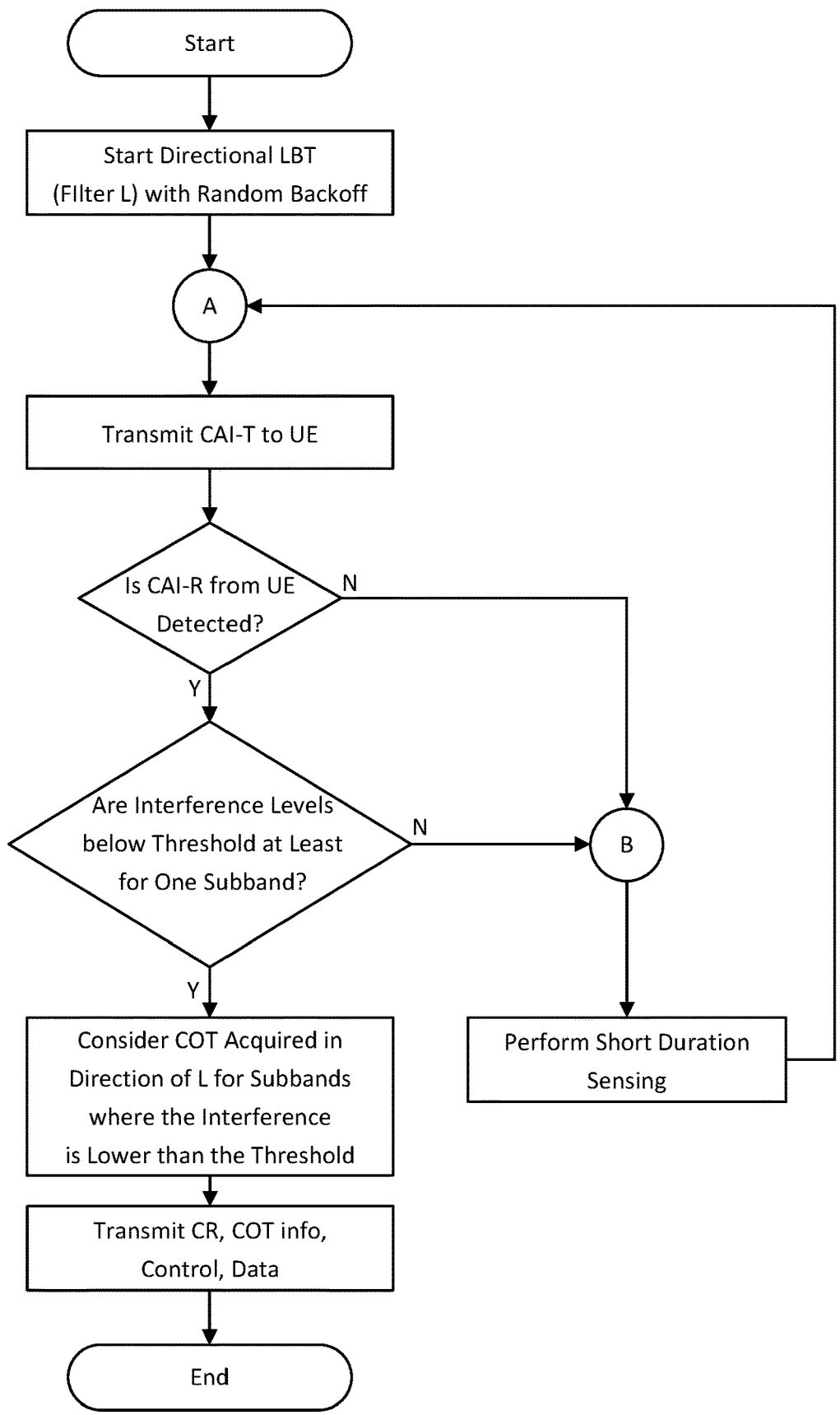

According to yet another embodiment, the gNB procedure for processing the LAI-R is shown in FIGS. 13A-B. In FIG. 13A, if all subbands show interference, the gNB releases the directional COT and restarts a fresh CAT4 LBT. If a subset of subbands show interference levels below the threshold, the gNB restricts its COT to those subbands and transmits only in that subset of subbands.

According to an alternative embodiment as exemplary embodiment is shown in FIG. 13B, the gNB retransmits the CAI-T to the UE and waits for an acceptable CAI-R response. As the channel is idle for the gNB, the gNB uses only CAT2 LBT prior to the retransmission.

If the number of CAI-T retransmissions in a COT exceed a pre-configured number, the gNB may restart the LBT procedure with a CAT4 LBT.

Figure 14A:
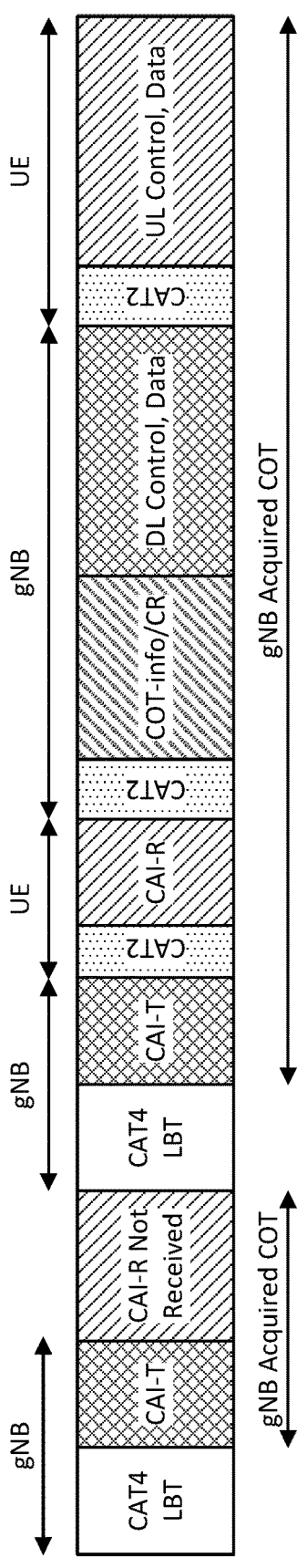
FIGS. 14A-B illustrate timelines for FBLBT procedure when CAT4 LBT is repeated if CAI-R indicates busy channel, and when CAI-R is retransmitted if CAI-R indicates busy channel, respectively, in accordance with an aspect of the application.
Figure 14B:
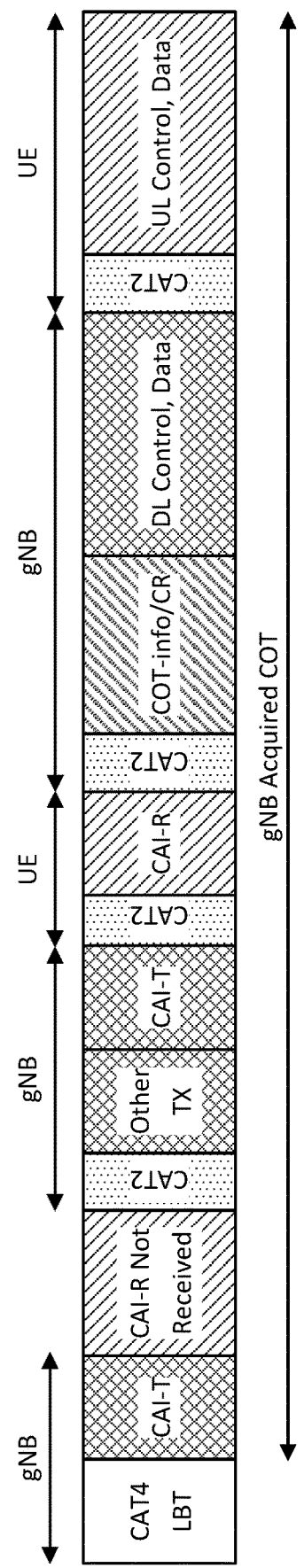

FIGS. 14A-B illustrate timelines for the FBLBT procedures in FIGS. 13A-B. Corresponding to FIG. 13A, FIG. 14A shows the scenario where the gNB does not receive CAI-R in COT1. As a result, it attempts CAT4-based access to handshake with the UE in the next channel access attempt when it accesses COT2.

Alternatively, the gNB may not release the COT when the UE fails to send the CAI-R. It may transmit signals to other UEs or a reservation signal in COT1. Corresponding to FIG. 13B, FIG. 14B shows the scenario when the gNB acquires COT1 but does not receive CAI-R from the UE. So it retransmits CAI-T in the same COT after some duration and finally receives CAI-R from the UE. In this duration, the gNB can keep the COT by transmitting to other UEs or transmitting a reservation signal.

In another example, if the COT duration of the interferer to the UE is known to the UE and sent the information on the CAI-R, the gNB may retransmit a CAI-T to the UE on expiration of the COT of that interference.

Modified Channel Sensing: Short Duration Sensing for CAI-T and CAI-R

Figure 15:
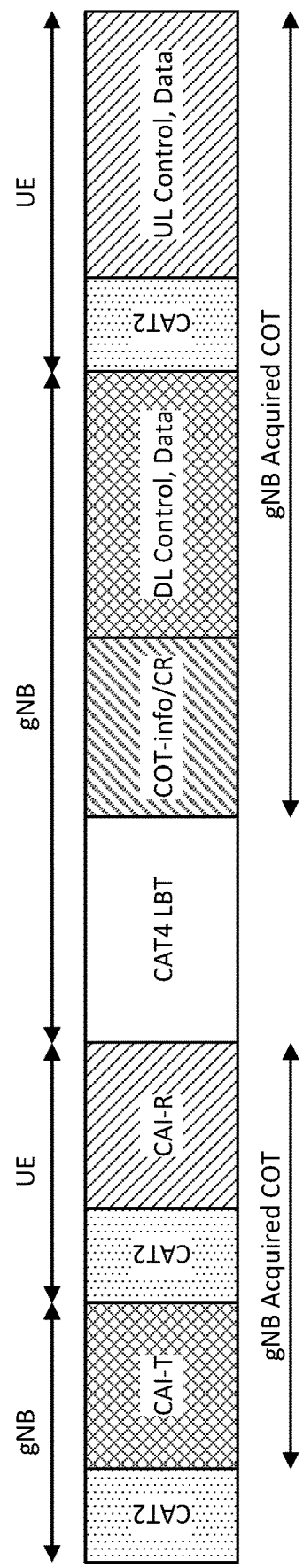
FIG. 15 illustrates CAI-T, CAI-R being transmitted using CAT2 sensing in accordance with an aspect of the application.

An alternative embodiment to the sensing procedure described in FIG. 6 is now discussed. As the CAI-T and CAI-R can be short duration signals and do not take much channel time, they may be transmitted following a short duration sensing such as a fixed duration sensing like CAT2 LBT in the sub-6 GHz. A sample timeline for gNB and UE functions is shown in FIG. 15. If CAI-R indicates clear channel, the gNB may perform a random backoff based channel sensing such as the CAT4 LBT to transmit COT information, control and data. This scheme allows the gNB to quickly check if the UE's environment is clear in a desired spatial direction prior to accessing the channel for data transmission. However, latency in the random backoff LBT can cause the UE's feedback on CAI-R to become obsolete. Therefore, the LBT procedure may be bounded by a maximum time after which the gNB fails the channel access and has to resend the CAI-T once again to initiate a channel access attempt.

Optional Transmission of CAI-T and CAI-R

Figure 16A:
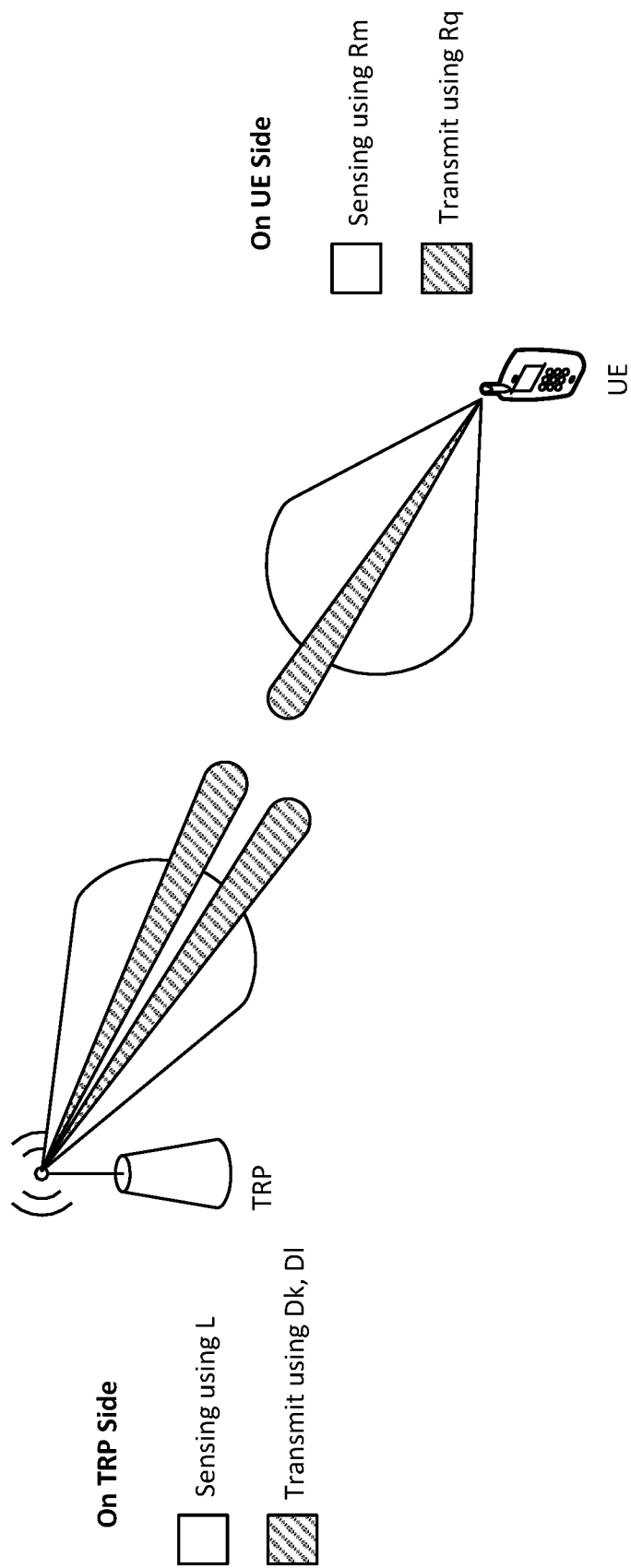
FIGS. 16A-B illustrate procedures for performing LBT and channel access with spatial filter L—NFBLBT for transmission spatial filter containment within LBT spatial filter containment, and for signaling between gNB and UE, respectively, in accordance with an aspect of the application.
Figure 16B:
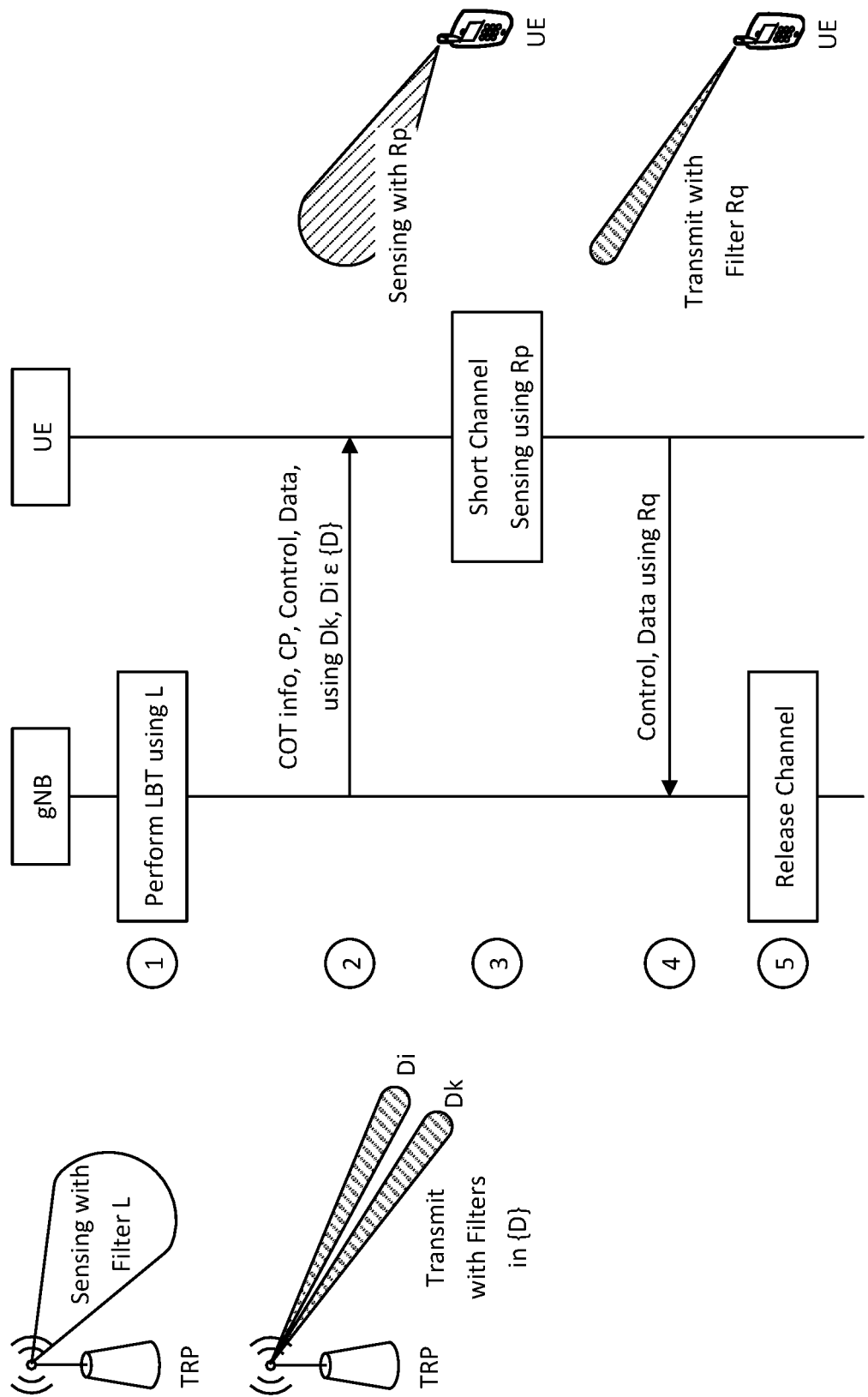

According to another embodiment as shown in FIG. 6, the network may determine whether FBLBT is required. When CAI-T and CAI-R are not transmitted in a channel access procedure, i.e., handshaking is not done, channel access as non-feedback-based LBT (NFBLBT) is considered as shown the embodiments shown in FIGS. 16A-B. FIG. 16A shows the overlaid LBT beams and transmission beams. FIG. 16B shows the spatial filters used in the LBT and signaling between the gNB and UE. The main steps of the procedure are described below.

1. The gNB selects a spatial filter L for performing LBT from a set $\{F\}$ of possible LBT spatial filters and performs channel sensing.

2. On having a clear channel, the gNB transmits one or more of COT information, control information, data, channel reservation (CR) signaling, by using one or more spatial filters from the set of spatial filter $\{D\}$ which satisfies the requirements to operate on the channel obtained through LBT filter L. In this example, the gNB transmits on two beams Dk, Dl∈$\{D\}$.

3. The UE senses the channel with a spatial filter Rp∈$\{R\}$ with a short duration sensing procedure like CAT2 LBT. The set of filters $\{R\}$ are determined according to L. The gNB provides implicit or explicit indication to the UE to determine Rp. For example, if the gNB provides an UL grant to the UE, Rp may be the filter used to transmits the PUSCH DMRS. Alternatively, Rp may be selected based on the TCI state of the DMRS of the CORESET that provided the grant. As another alternative, the COT indication or CR signal or a combination of the COT information and CR may either directly indicate Rp or indicate L from which the UE can infer Rp.

4. On finding the channel to be clear, the UE transmits data and/or control information using spatial filter Rq.

5. Once the communication is complete, the gNB releases the channel by stopping transmission on it.

Figure 17:
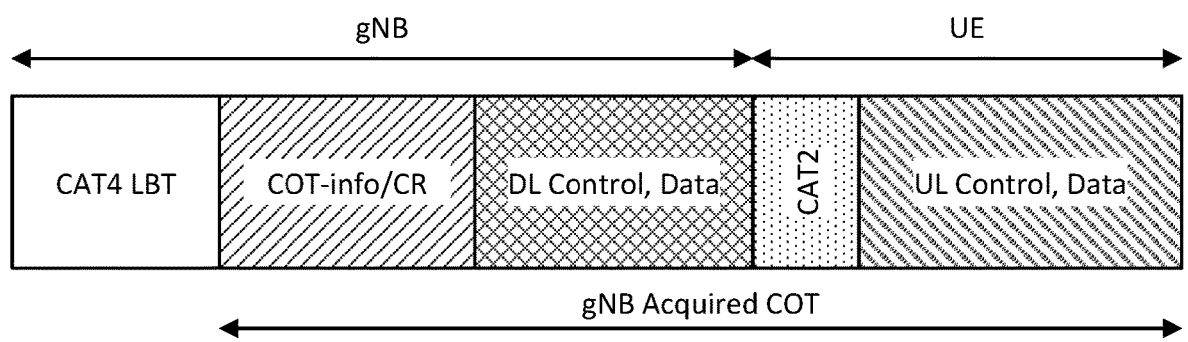
FIG. 17 illustrates a timeline showing gNB acquired direction CIOT using directional LBT—NFBLBT in accordance with an aspects of the application.

The timeline for channel sensing and transmission from the gNB and the UE in the gNB acquired COT is shown in the exemplary embodiment in FIG. 17.

Flexible Application of FBLBT and NFBLBT Procedures

FBLBT may not be required in every deployment. Considering that the beams are highly directive, in many situations, the receiver may be able to effectively mute the interference from hidden nodes. However, in dense networks and high traffic scenarios, FBLBT may be a better choice to improve spatial reuse while managing interference from hidden nodes.

The FBLBT may be used when the LBT spatial filter L satisfies certain conditions. This may include, for example, if the HPBW of the beam from L is less than a certain threshold OHPBW, thresh. This ensures that the overhead associated with the CAI-T and CAI-R signaling is reduced when the network can afford LBT over wide spatial angles such as with omni and quasi-omni filters. OHPBW, thresh may be configured by the network.

Alternatively, the spatial filters may be associated with the scheme to transmit CAI-T/CAI-R or to not transmit CAI-T/CAI-R. For example, a DL spatial filter that is QCLed with a certain DL RS or an UL spatial filter that is in correspondence with a DL RS may be configured to transmit or not transmit the CAI.

Figure 18:
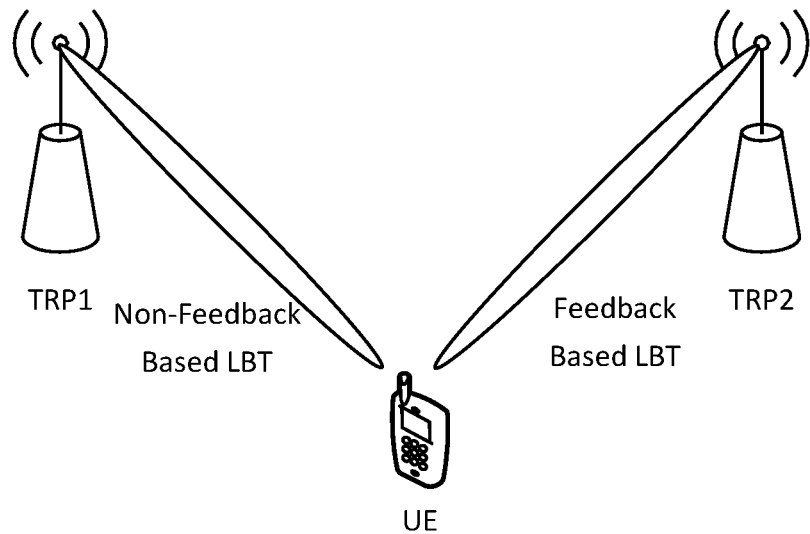
FIG. 18 illustrates NFBLBT on link to TRP1 and FBLBT on link to TRP2 in accordance with an aspect of the application.

The type of LBT (FBLBT or NFBLBT) may be configured by the network. In one example, this information may be provided through broadcast system information (SI) such as RMSI or OSI. So all the devices in a network use one form of LBT. In another example, the network may determine increased transmitter-deafness or interference for the receiver in certain spatial locations, and may activate FBLBT only for devices determined to be in those locations while other devices may use NFBLBT. Here, transmissions QCLed with a subset of RS use FBLBT. This configuration may be provided in a UE-specific manner or groupcast manner through higher layer signaling. Thus, transmissions QCLed or in correspondence (in the reverse link) with certain SSBs or CSI-RS or SRS may use FBLBT. A UE may be connected to two TRPs in the same cell and use NFBLBT on the link with TRP1 and FBLBT on the link with TRP2 as shown in FIG. 18.

In another example, the type of LBT may be dynamically determined. If the node receives a CAI-T, it infers the need for a FBLBT procedure and it transmits the CAI-R. If the node does not receive the CAI-T but directly receives control or data signals, it infers the need for a NFBLBT procedure and does not transmit CAI-R.

The type of LBT may be determined based on a measurement of certain CSI-RS. If the measured power level falls below a certain threshold, FBLBT may be preferred. Similarly, the type of LBT may be determined based on observed interference levels through energy detection. If the interference level exceeds a certain threshold, FBLBT may be preferred.

Furthermore, the spatial filter Rp for sensing prior to UE's transmission in the gNB acquired COT may be configured differently for FBLBT and NFBLBT methods. For example, for FBLBT, the network can afford to have more directional LBT without negative impact as the handshake ensures a clear channel at the transmitter and receiver. On the other hand, for NFBLBT, a wider filter may be desired.

If FBLBT based channel access is successful and a first COT is obtained, the communicating nodes may not perform FBLBT for duration T following the acquisition of the first COT. This helps preserve minimal overhead due to the handshaking procedure. For example, the gNB may acquire the first COT through FBLBT and provide an UL grant outside the first COT to the UE. The UE may need not need to perform FBLBT to acquire the COT for UL transmission. Instead the UE may perform NFBLBT and transmits PUSCH.

Adaptative LBT

In the CAT4 LBT procedure used in the sub-6 GHz frequency, if the channel is available in an initial CCA period (using short duration sensing), the node performs extended CCA (eCCA) by setting a counter with a random backoff value within its contention window duration. The node defers transmission until this counter reaches 0. During this period, the node periodically senses the channel for one eCCA slot duration. If it senses a busy channel, it pauses the counter. Otherwise, it decrements the counter. When the counter reaches zero, the node begins transmission.

Figure 19:
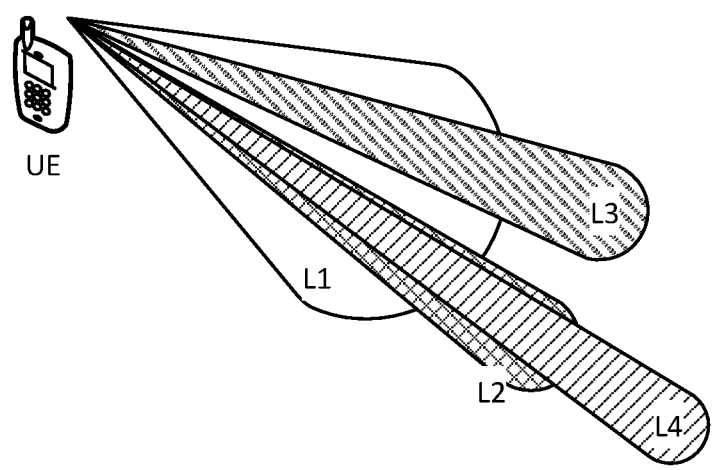
FIG. 19 illustrates spatial filters L1, L2, L3 and L4 for LBT where a UE begins with a wide beam and if a channel is busy, the UE attempts LBBT with a narrower beam in a different spatial orientation in accordance with an aspect of the application.
Figure 20:
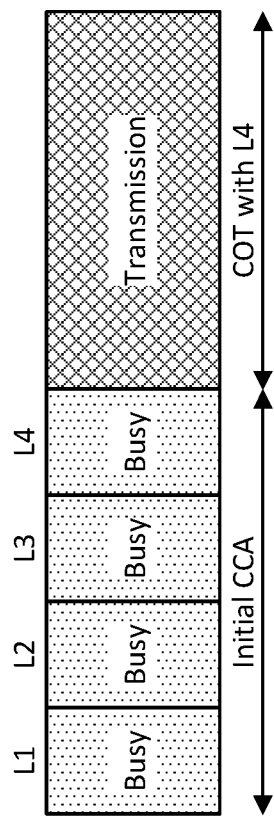
FIG. 20 illustrates a timeline showing adaptation of LBT spatial filter in an initial CCA period in accordance with an aspect of the application.

This procedure may be adapted to manage spectral reuse in the network by adapting the spatial filters in the LBT procedure. A node may start the idle mode sensing with spatial filter L1. If the node does not obtain clear channel, it may restart sensing with a narrower beam L2, failing which it senses with another beam using spatial filter L3 with a different orientation or with a still narrower beam L4. The node may continue in this manner until it finds the spatial filter with smallest allowable angular spread for which the channel is clear. The beams generated with spatial filters L1, L2, L3 and L4 are illustrated in the exemplary embodiment in FIG. 19. FIG. 20 shows a sample timeline for sensing during the initial period wherein, the LBT spatial filter is adapted.

Figure 21:
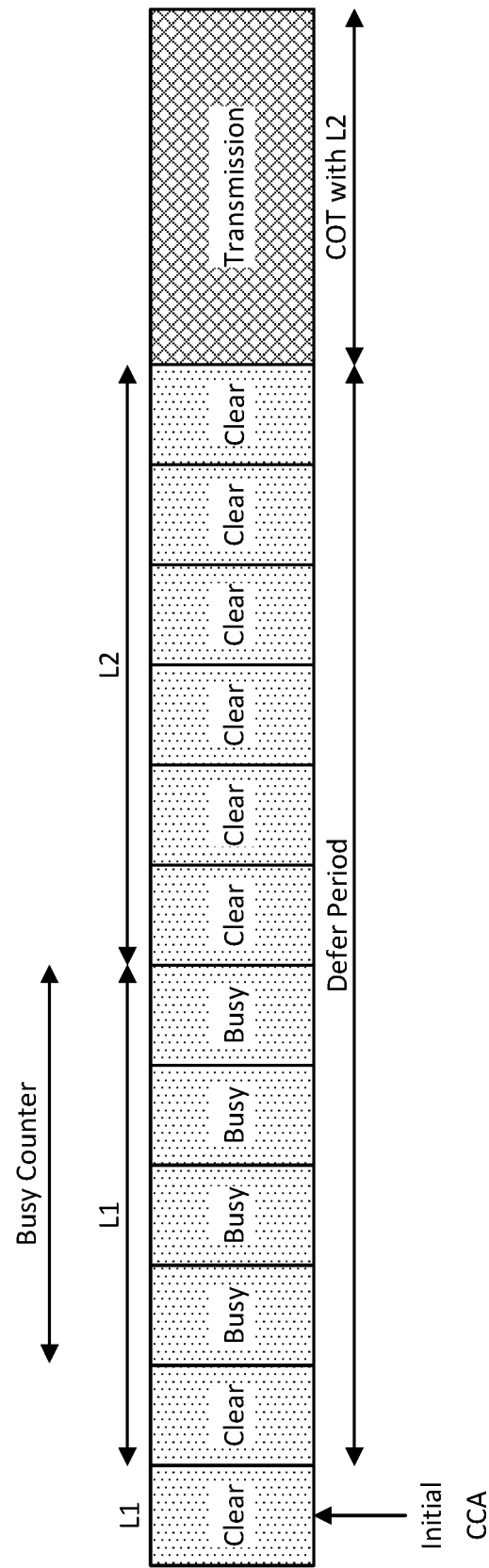
FIG. 21 illustrates a UE timeline showing adaptation of LBT spatial filter based on clear or busy channel in extended CCA period in accordance with an aspect of the application.

If the node gets a clear channel in the initial sensing phase with filter L1, it begins the extended sensing phase with L1. However, if the node experiences a busy channel with L1 for a duration given by the timer busy Counter, the node may select L2 to continue to sense in the extended period. The busy Counter is set each time (based on a configuration provided by the higher layers) the spatial filter for sensing is updated and counted down when the defer-period counter is paused. The timeline is shown in FIG. 21 where the UE starts with LBT spatial filter L1. During the defer period, it experiences busy channel for a duration that exceeds the busy Counter. So the UE continues channel sensing with L2 which has a narrower beam and allows clear channel. On successful completion of the defer period, the UE obtains channel access with a COT in a spatial direction given by L2.

In certain use cases, it may be beneficial to configure the busy Counter according to the beam width or angular spread or HPBW. For example, wider the beam, shorter the busy Counter. This may enable quick adaptation to a narrow spatial channel.

Figure 22:
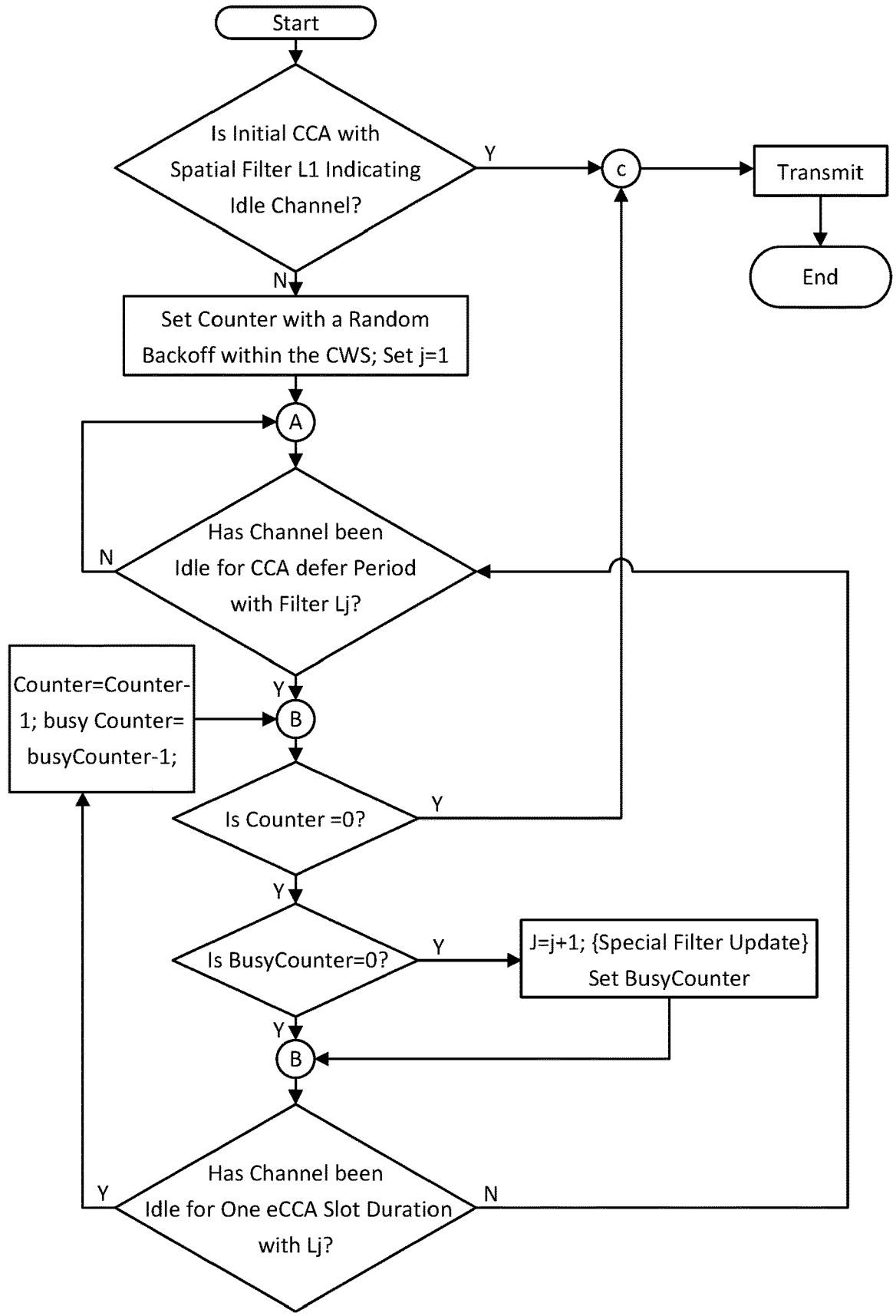
FIG. 22 illustrates a UE procedure for channel access with LBT beam adaptation in accordance with an aspect of the application.

In another exemplary embodiment as shown in FIG. 22, the UE for channel access with LBT beam adaptation is illustrated. Here, the UE starts initial CCA with spatial filter L1. In the eCCA period, the UE changes the beam and continues sensing if the busy Counter counts down to zero.

Contention Window Size (CWS) Adjustment in FBLBT

Acknowledgement in response to a transmission such as PDSCH or PUSCH is used to set the size of the contention window. If negative acknowledgements are encountered, the window size is increased to allow more time for channel access, expecting that the interference will expire in that time and the channel will be idle. It is envisaged the CAI-R may also be used to adjust the CWS for FBLBT. The transmitter may increase its CWS under the following conditions:

A. CAI-R is not received by the transmitter. This can happen if the receiver did not receive CAI-T and therefore did not send CAI-R. Or this may happen if the transmitter's channel is bad and can therefore it cannot not detect CAI-R.

B. CAI-R is received but indicates interference exceeding a threshold Sthresh dBm.

Otherwise, if the CAI-R is received and the interference is below Sthresh dBm, the CWS may be left unchanged. Otherwise, the CWS is adjusted based on the interference level; typically, the CWS is increased in response to increasing interference levels. In this case, the HARQ acknowledgement bits (to CBGs or TBs) may further impact the CWS. A receiver may be able to transmit CAI-R even though its channel is poor as the CAI-R is expected to be of short duration and wide bandwidth. However, the channel conditions may not be good enough to support data transmission.

When energy detection-based sensing is used, the node may use a higher threshold for the LBT procedure preceding the CAI-R transmission. But it may use a lower threshold for LBT preceding data transmission. Accordingly, it is possible to transmit CAI-R in view of interference. The CAI-T may indicate the threshold to be used for channel access for CAI-R.

Figure 23:
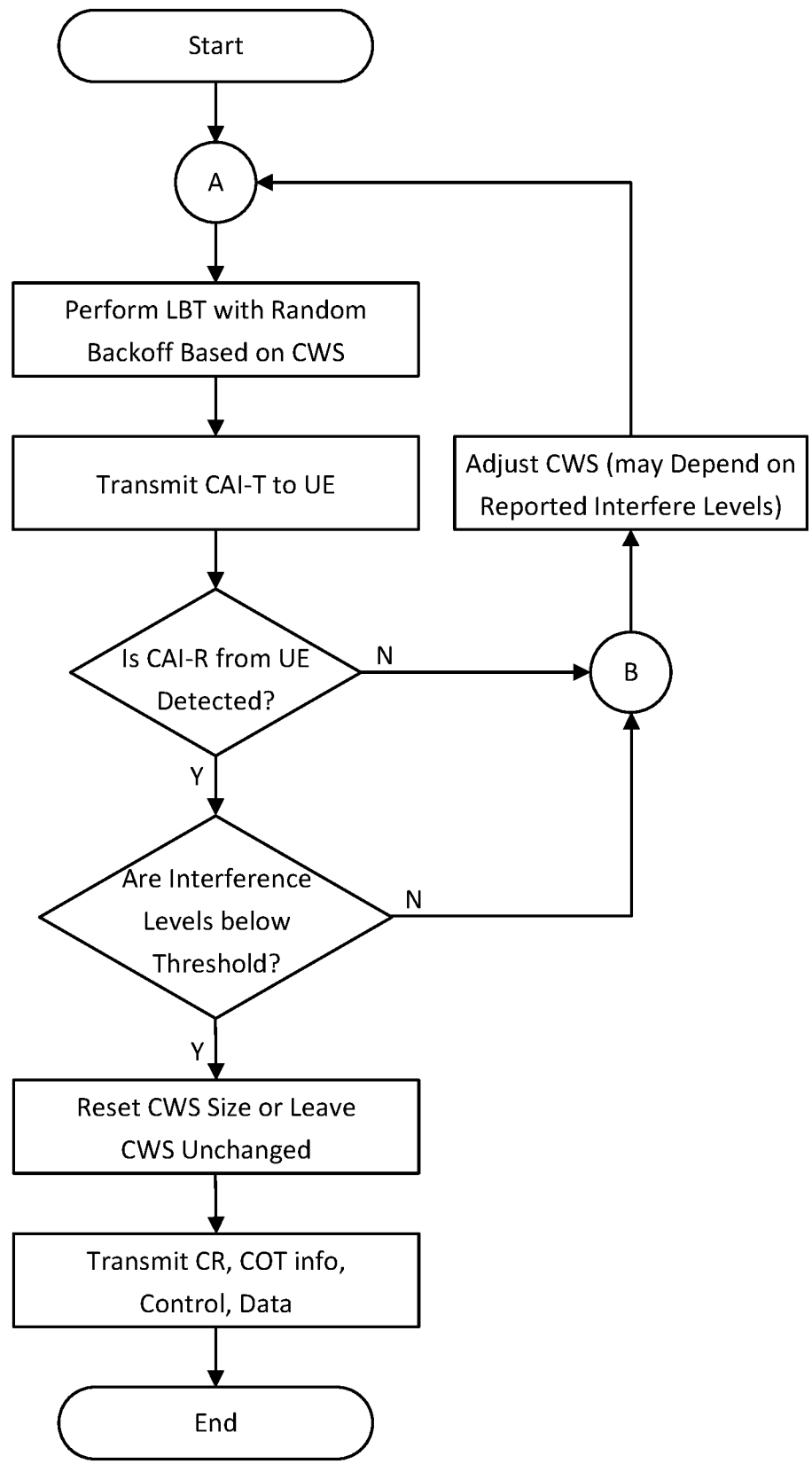
FIG. 23 illustrates a procedure for CWS adjustment based on CAI-R in accordance with an aspect of the application.

In an alternate embodiment of this aspect, if the CAI-R is received and the interference is below Sthresh dBm, the CWS is reset to the minimum value. Further, the HARQ acknowledgement bits (to CBGs or TBs) may impact the CWS. Adjusting the CWS is shown in the exemplary embodiment illustrated in FIG. 23.

Acquisition of COT in Multiple Spatial Directions and Multiple Subbands

Figure 24A:
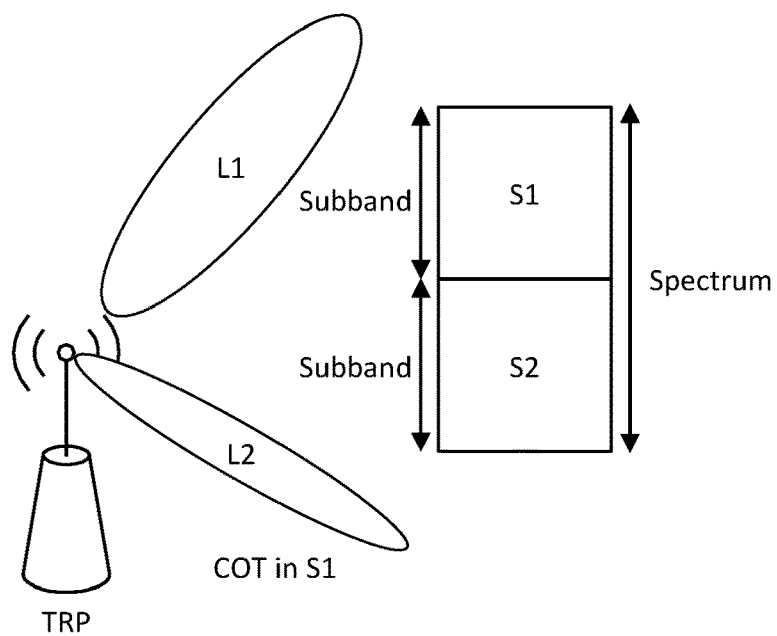
FIGS. 24A-C illustrate a directional COT acquisition in multiple spatial directions and subbands in accordance with an aspect of the application.

According to yet another aspect of the application, a node may acquire COT(s) in more than one spatial direction. Additionally, since one or more subbands may be available, each directional COT corresponds to certain sets of subbands for which a channel is accessed. FIG. 24A shows an exemplary embodiment of this aspect. Here, two subbands are available in the spectrum and the TRP gets channel access in two directions—directional COT with L1 in subbands S1 and S2 and directional COT with L2 in subband S1.

Figure 24B:
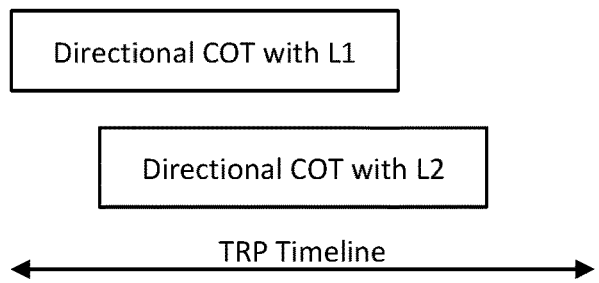

These COTs may alternatively start at different times but partly overlap in time as shown in FIG. 24B. In even a further alternative embodiment the directional COTs may start at the same time and can end at the same or different times as showing in FIG. 24C. Generally, the node must mute its transmission on L1 to perform sensing for L2 to avoid self-interference. If one direction falls in the null of the other direction, the muting may not be required. Multiple TRPs of a single cell can obtain channel access such as that in FIG. 24B.

Figure 24C:
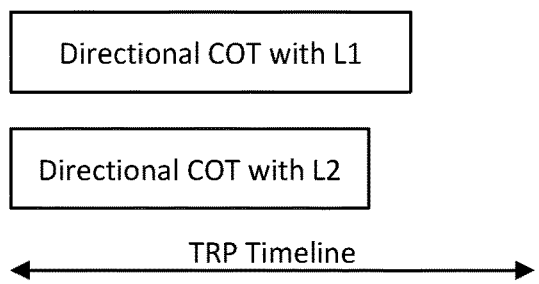
Figure 25A:
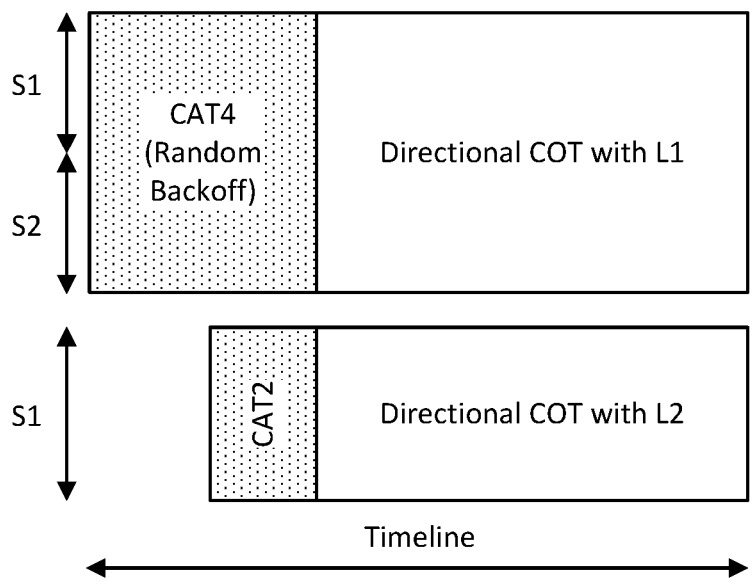
FIGS. 25A-B illustrate a multi directional COT acquisition with CAT2 for additional directional COTs, and CAT4-based LBT for all directions with self-deferral to align the directional COTs, respectively, in accordance with an aspect of the application.

For the operation in FIG. 24C, the channel access may be obtained in the following ways. In one approach, the node selects a spatial direction L1 in which it will perform LBT with a random backoff such as CAT4 LBT in a wide band which is an aggregate of subbands S1 and S2. It senses other spatial directions such as L2 on subband S1 with a short duration LBT such as CAT2 LBT as shown in FIG. 25A. Certain restrictions may be introduced on the spatial directions for CAT2 LBT. This may include, for example, angular spread of L2 is less or equal to that of L1. Greedy channel access is avoided by performing CAT4 on a narrow beam and CAT2 LBT on a wider beam. There may also be restrictions on the number of beams or the total angular spread of the accessed channel through CAT2 LBT. Additionally, the CAT2 LBT may not be used to access channel on spectrum outside the subbands obtained through CAT4 LBT—for example, a subband S3 may not be accessed with CAT2 LBT with filter L2.

Figure 25B:
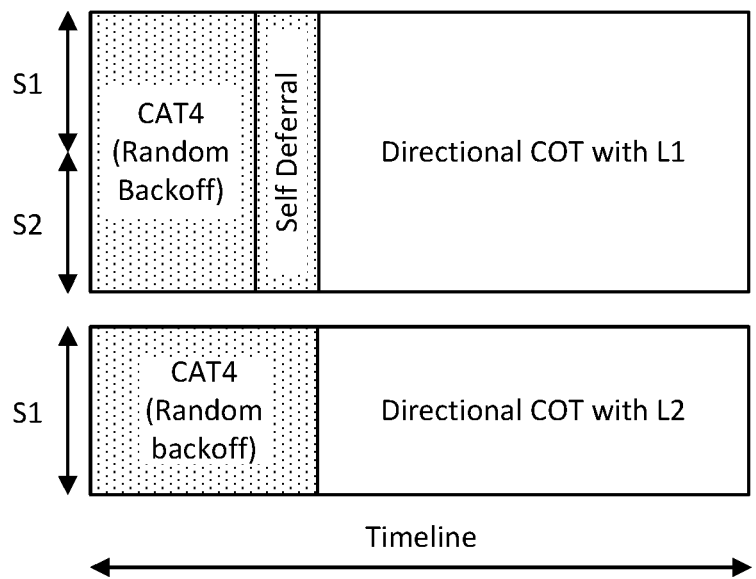

In another approach, the node performs LBT with random backoff with multiple directional filters. The node may transmit on the directions for which it has successful LBT with potential self-deferral to align all the directional COTs. This is exemplarily shown in FIG. 25B.

Figure 26:
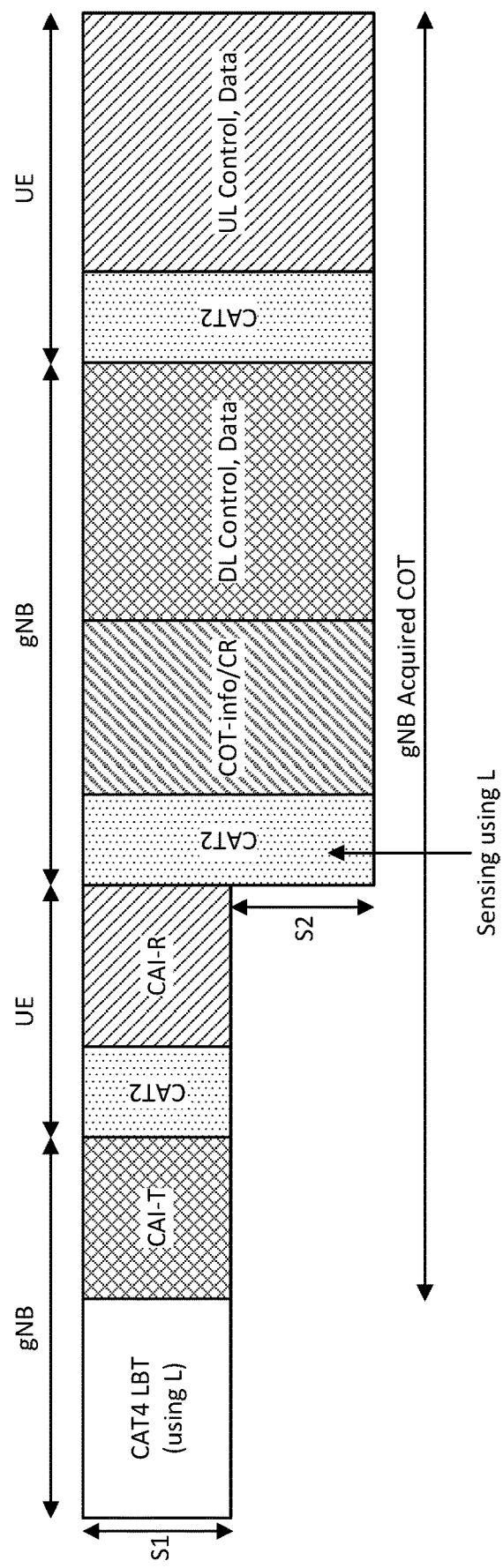
FIG. 26 illustrates subband aggregation in FBLBT in accordance with an aspect of the application.

Another exemplary embodiment as shown in FIG. 26 describes FBLBT. For CAI-T transmission, the sensing is performed on subband S1 with spatial filter L. However, after CAI-R is received from the UE, the gNB may perform CAT2 sensing over S2 using spatial filter L (in addition to sensing in S1). If S2 is also clear, the gNB acquires the channel in S2 and aggregates the subbands in that directional COT.

Directional COT-Information Indication

COT-related information may be signaled explicitly when the gNB confirms it has reserved the channel. The gNB may indicate the COT in a broadcast or groupcast manner so that other nodes can read the signal and avoid unsuccessful channel attempts when the channel is occupied. This signal may be in the form of a channel reservation signal or control signal or a combination of both. It may be a preamble that can be read by other networks such as WiGiG. Alternatively, the COT-related information may be read at least by nodes within the network or node outside the network but using the same technology as the transmitter. Alternatively, the COT-related information may be unicast to the UE in communication with the gNB during that channel access.

Alternatively the gNB may indicate the COT-information in the CAI-T. If the CAI-R is not received or a subsequent short duration CCA fails, the gNB prematurely releases the COT. This may result in other nodes to backoff channel access based on CAI-T for longer than the true channel occupation time but can reduce the overhead from a separate COT-information signaling.

The COT-indicator may provide one or more of the following types of information. These aspects may be described in association with FIG. 6 and FIG. 16:

A. The transmitter ID which may be a network ID such as a Cell ID or a TRP-ID or a UE ID such as the C-RNTI.

B. The receiver ID which may be a network ID such as a Cell ID or a TRP-ID or a UE ID such as the C-RNTI or a groupcast identifier such as COT-RNTI or a broadcast identifier such as B-COT-RNTI.

C. The duration for which the channel will be occupied from a reference time. The reference time may correspond to the start or end of the OS or a mini-slot or slot or subframe or frame carrying the COT-indicator. The duration of channel occupancy may be indicated in terms of number of OS or mini-slots or slots or subframes and may be provided as an index into a pre-configured table of possible values.

D. Spatial filter information on L (LBT filter). This may be provided as an index into a table of possible values for the spatial filter. For example, the spatial filter L is indicated as a state that is QCL with one of the SSBs or CSI-RS. On receiving this, the receiver recognizes the spatial dimension of the transmitter's COT. The UE may use this information to select the LBT spatial filter Rm for channel sensing prior to sending CAI-R.

E. Spatial filter information on Di (LBT filter). This may also be provided as an index into a table of possible values for the spatial filter and may be defined through a QCL relationship with an RS known to the UE. The UE may use this information to select the LBT spatial filter Rp for channel sensing prior to sending control or data.

F. Resources for transmitting the CAI-R. The time, frequency resources for LAI-R may be explicitly indicated in that CAI-T. This may be in the form of a PDSCH grant for CAI-R or a PUCCH resource CAI-R or a RACH resource for CAI-R.

G. Explicit indication of spatial filter for Rm or Rp (filter for receiver LBT). An explicit RS may be indicated to the UE as the beam for performing channel sensing prior to the transmission of CAI-R.

H. Bandwidth over which UE must perform the LBT and report through CAI-R.

The gNB may transmit the CAI-R over certain bandwidth BL after performing LBT over BL with spatial filter L. However, DL data transmission may be intended over bandwidth BD. So, the UE is be required to perform LBT over BD. Therefore, the gNB indicates BD as the bandwidth for the UE to perform LBT.

I. Channel sensing threshold Vthresh which is used to determine if the channel is idle. If the energy sensed exceeds Vthresh, the node treats the channel as busy. Vthresh may be determined based on the feedback from CAI-R for FBLBT. Vthresh may be different for different subbands and spatial directions. Therefore, it may be provided per subband and directional COT.

Virtual Sensing Using the Channel Reservation Signal or COT Indication

Figure 27A:
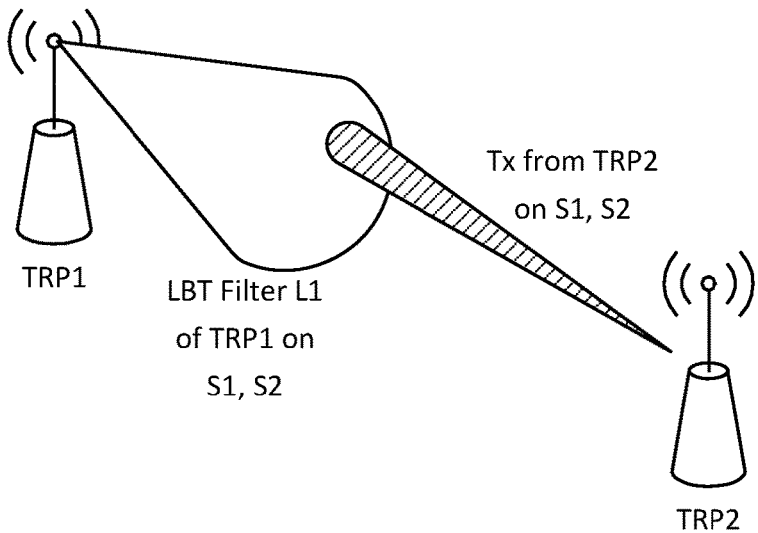
FIGS. 27A-B illustrate virtual sensing with network configuration and TRP1 sensing TRP2's occupation in S1 and S2 using spatial filter L1, respectively, in accordance with an aspect of the application.

When a node, such as for example the TRP1 in the exemplary embodiment in FIG. 27A, listens to check if the channel is idle it may obtain the COT information for a transmission from TRP2. This may be performed, for example, by detecting the channel reservation (CR) signal. Either the reservation signal itself indicates the COT information or the presence of the reservation signal implies that COT information follows in a control signal. On detecting the COT information, TRP1 identifies the time, subband and spatial resource information of TRP2's transmission. While time and subband information can be understood directly, the spatial information is interpreted in terms of the spatial filters used to detect the reservation signal. If a spatial filter L1 is used to determine this directional COT, then until the time of the COT expires in the indicated subbands, the TRP1 need not sense the channel at least using L1. This may also imply that TRP1 need not sense the channel with certain spatial filters that may partly or fully overlap L1 during the COT and in the indicated subbands.

Figure 27B:
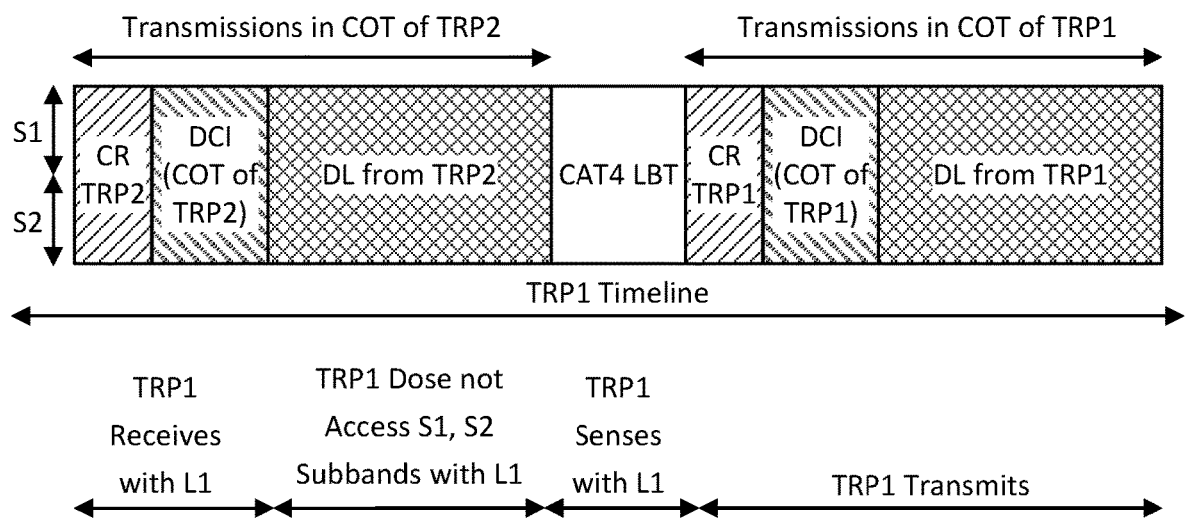

In FIG. 27B, the TRP1 detects channel occupation in S1 and S2 using spatial filter L1 for certain duration indicated in TRP2's COT indicator. So TRP1 does not access the channel in S1 and S2 with filter L1 until TRP2's COT expires. In fact, TRP1 may sleep in this duration and save power. This is a form of virtual sensing. In other words, the COT information received with filter L1 is used to indicate the duration when sensing is not meaningful as another node is using the channel.

Figure 28A:
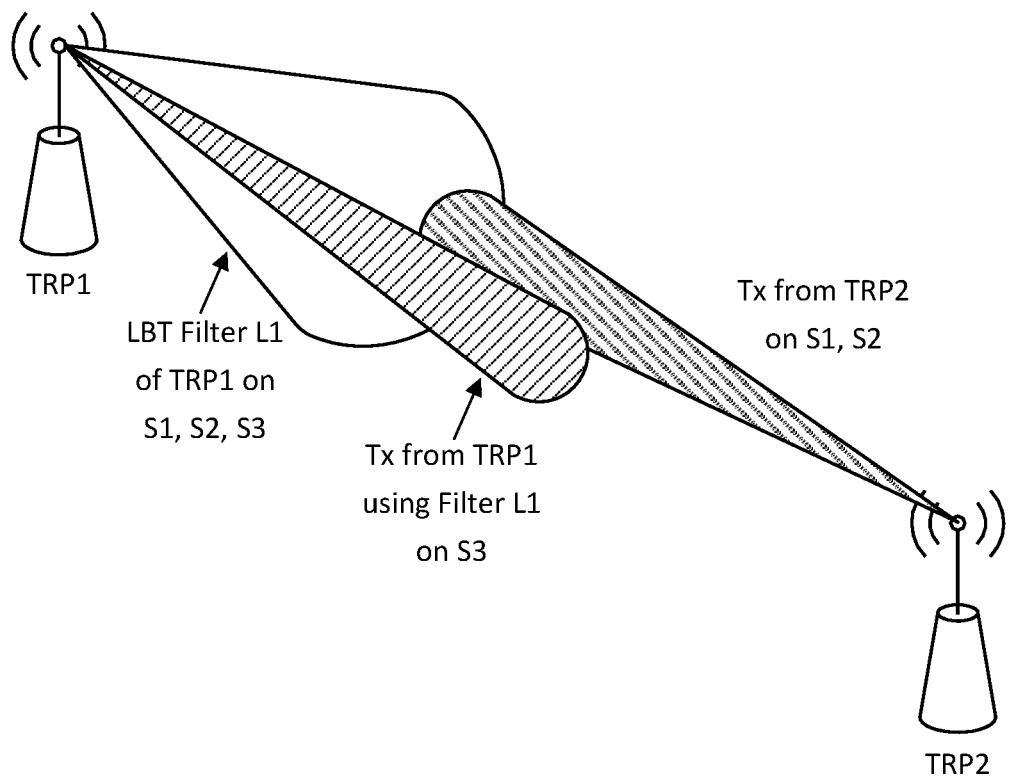
FIGS. 28A-B illustrate a COTs separated in frequency network configuration, and instance where TRP1 does not transmit in S1 and S2 uses D1 as it senses TRP2's occupation, respectively, in accordance with aspect of the application.
Figure 28B:
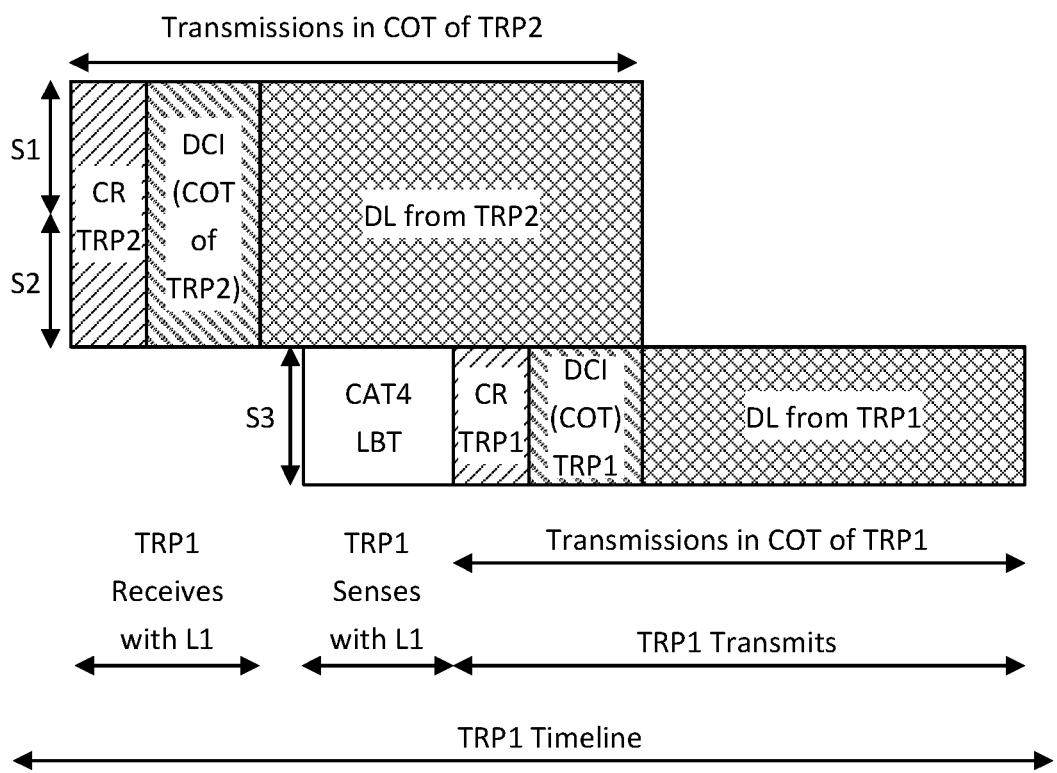

This does not preclude TRP1 from accessing the channel in subbands not included in TRP2's COT with filter L1. This is shown in the network configuration in FIG. 28A and timeline of TRP1 in FIG. 28B. Here, TRP1 detects TRPs COT information and subbands S1 and S2 using spatial filter L1. TRP1 does not access S1 and S2 using L1 during the duration of TRP2's COT. Instead, TRP1 access the channel in S2 using the spatial filter L1. As the COTs of TRP1 and TRP2 are separated in frequency, there is no mutual interference.

Figure 29A:
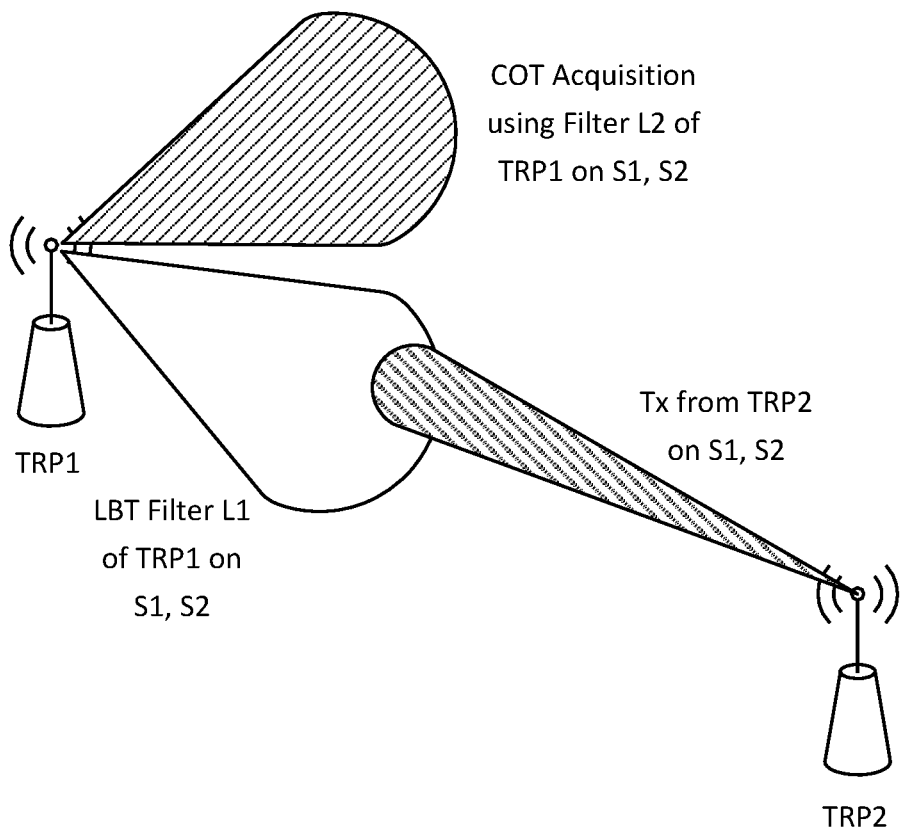
FIGS. 29A-B illustrate spatial reuse through a non-interfering directional COT for TRP1 network configuration, and when TRP1 does not transmit using L1 as it senses TRP2's occupation, respectively, in accordance with aspect of the application.
Figure 29B:
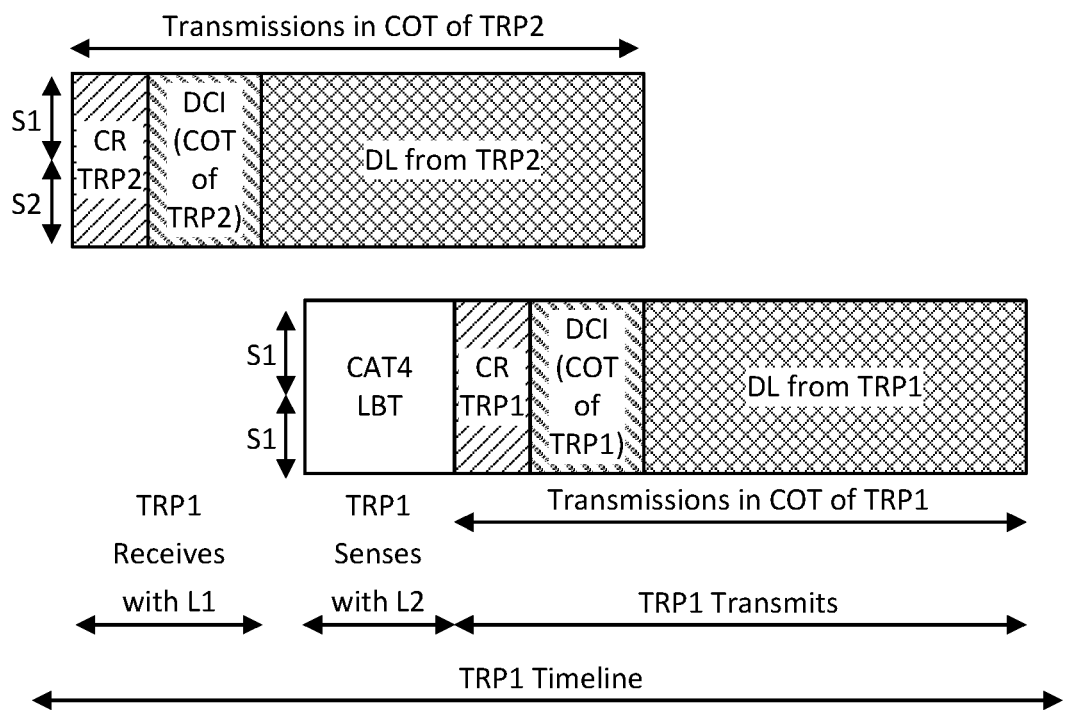

TRP1 may also access the channel on a non-overlapping spatial filter L2 overlapped with COT of TRP2 as shown in the network configuration in FIG. 29A and the timeline of TRP1 in FIG. 29B. On detecting that TRP2 is occupying S1 and S2 with filter L1, TRP1 selects a spatial direction L2 that is non-overlapping with that of spatial filter L1 and performs channel access to get the directional COT is S1 and S2.

According to yet a further embodiment, procedures to select a spatial domain filter on receiving one or more CR signals and COT information from other nodes are described. The nodeX (can be a UE or a TRP) monitors for COT indication from other nodes. When nodeX detects a COT indicator with spatial filter L1, it stores the indicated duration, subbands and its own spatial filter L1. nodeX may maintain a table of such values if it receives multiple COT indicators. An example is shown in Table 2 below.

TABLE 2

| | | COT indicator of other nodes | | |
|---|---|---|---|---|
| Index | ID of transmitter | Time (ms) | Set of Subbands | LBT filter of nodeX |
| 1 | nodeY | 5 | S1 | L1 |
| 2 | nodeZ | 3 | S1, S2 | L2 |
| 3 | nodeW | 8 | S2, S3 | L3 |

Figure 30:
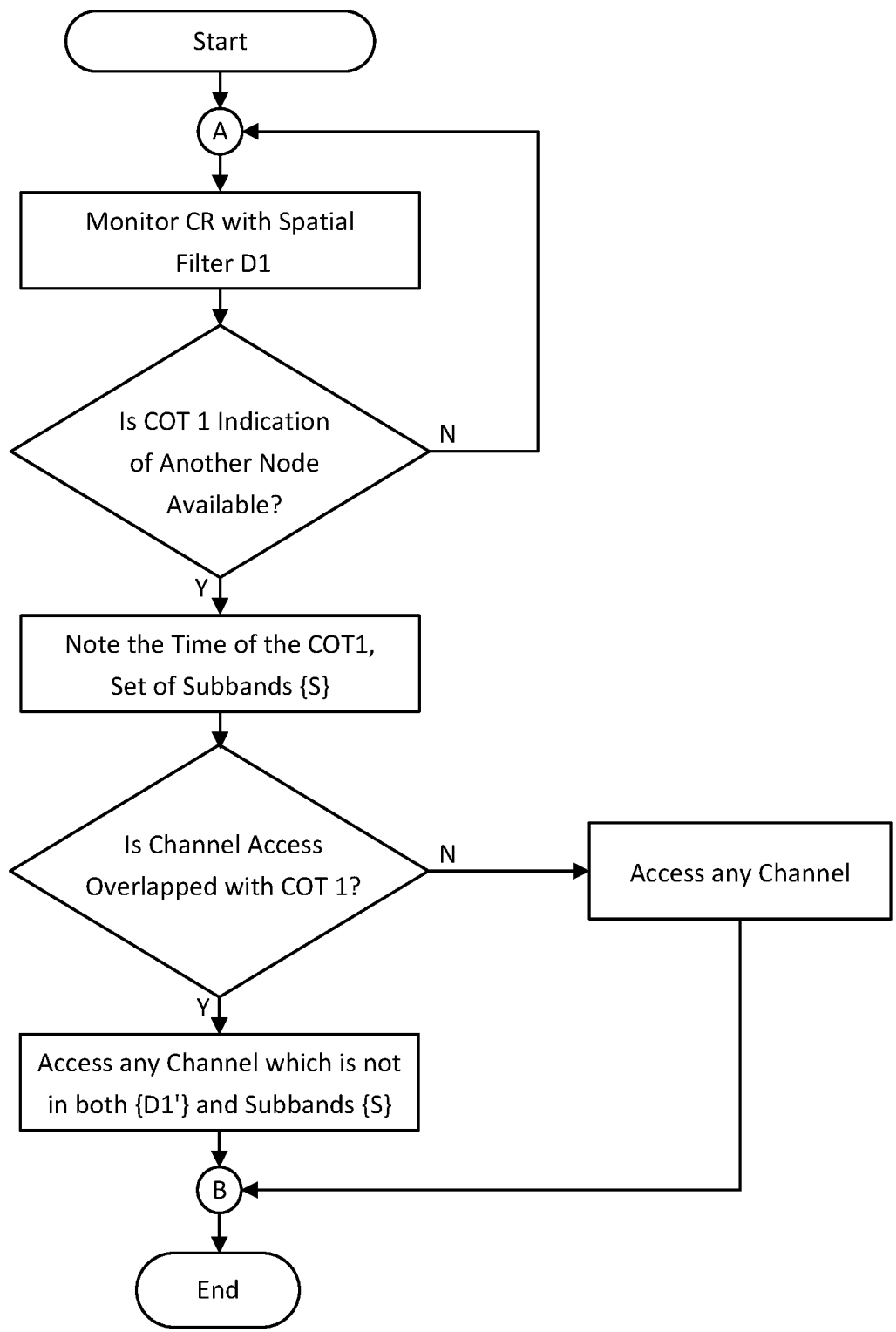
FIG. 30 illustrates a procedure for spatial reuse including determining the spatial, time and frequency resources for performing a channel access after virtual sensing in accordance with an aspect of the application.

For accessing the channel, nodeX ensures that it selects a channel resource that does not interfere in time or frequency or space with the entries in the table. Once the COT expires for an entry in the table, nodeX may delete that entry from the table. This procedure is shown in the exemplary embodiment of FIG. 30 when nodeX receives a single COT indicator from nodeY, and determines its channel access resources based on that COT indicator. nodeX determines that the set of filters {L1'} that may overlap with L1 and cannot be used in the set of subbands {S} indicated by the COT indicator for duration of nodeY's COT. If nodeX must access the channel simultaneously with the COT of nodeY, nodeX cannot use channel resources corresponding to {L1'} and {S}. Outside the duration of the COT of nodeY, nodeX does not have any restrictions in accessing the channel.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A method for obtaining channel access in a network comprising:
   selecting, via a gNodeB (gNB), a spatial filter from a first set of spatial filters to perform listen before talk (LBT);
   detecting, via the gNB, a channel in an idle state;
   obtaining, a directional channel occupancy time (COT) in the channel in a direction of the selected spatial filter;
   transmitting, to a node, a channel access indicator transmission (CAI-T) on a beam in the COT via a spatial filter of a second set of spatial filters;
   receiving, from the node, a channel access indicator response (CAI-R);
   sensing, via short channel sensing and via the spatial filter or another spatial filter of the second set of spatial filters, the channel is clear; and
   sending, via the channel, information to the node using one or more spatial filters of the second set of spatial filters.

2. The method of claim 1, further comprising:
   terminating transmission on the channel; and
   releasing the channel based on one or more of presence, absence and content of the CAI-R.

3. The method of claim 1, wherein
   the beam includes plural beams,
   the node includes plural nodes, and
   each of the plural beams supports one or more of the plural nodes.

4. The method of claim 3, wherein
   the CAI-R is not received from one of the plural nodes, and
   the transmission is either not sent to the one plural node, or not sent to the one plural node and another one of the plural nodes sharing one of the plural beams.

5. The method of claim 1, further comprising:
   retransmitting the CAI-T to the node or receiving a retransmission of the CAI-R from the node.

6. The method of claim 1, wherein a contention size window (CSW) is adjusted in view of feedback indicated by the CAI-R.

7. The method of claim 1, wherein the detecting the channel is performed across plural beams in different subbands.

8. The method of claim 1, wherein the information includes one or more of COT information, channel access duration, control information, data, sub band indication, spatial filter information and channel reservation signaling.

9. The method of claim 1, wherein the node is user equipment.

10. An apparatus comprising:
    a non-transitory memory for obtaining channel access in a network; and
    a processor operably coupled to the non-transitory memory configured to execute instructions of:

receiving, from a gNodeB (gNB), a channel access indicator transmission (CAI-T) on a beam in a channel occupancy time (COT) of a channel;
selecting a spatial filter from a set of spatial filters;
sensing via short channel sensing and via the selected spatial filter of the set of spatial filters;
transmitting, to the gNodeB, a channel access indicator response (CAI-R) using the selected spatial filter or another spatial filter of the set of spatial filters;
receiving information from the gNodeB;
sensing, via short channel sensing and a second spatial filter of the set of spatial filters;
determining the channel is clear; and
transmitting, to the gNB, one or more of data and control information via a third filter from the set of spatial filters.

11. The apparatus of claim 10, wherein the apparatus is configured to simultaneously access the channel in plural spatial directions.

12. The apparatus of claim 11, wherein accessing the channel via one of the spatial directions is backoff-based, and access the channel via another one of the spatial directions is based on short channel sensing.

13. The apparatus of claim 10, wherein the beam includes plural beams, supporting the apparatus and one or more nodes, and each of the plural beams supports at least one of the apparatus and the one or more nodes.

14. The apparatus of claim 13, wherein
the CAI-R is not transmitted on of the plural beams by one of the nodes or the apparatus, and
control information from the gNodeB is either not sent to the one of the plural nodes or the apparatus, or not sent to the one of the plural nodes and the apparatus sharing one of the plural beams.

15. The apparatus of claim 10, further comprising:
receiving a re-transmission of the CAI-T.

16. The apparatus of claim 10, wherein a contention size window (CSW) is adjusted in view of feedback indicated by the CAI-R.

17. An apparatus comprising:
a non-transitory memory for obtaining channel access in a network; and
a processor operably coupled to the non-transitory memory configured to execute the instructions of:
selecting a spatial filter from a first set of spatial filters to perform listen before talk (LBT);
obtaining, a directional channel occupancy time (COT) in a channel in a direction of the selected spatial filter;
transmitting, to a node, a channel access indicator transmission (CAI-T) on a beam in the COT via a spatial filter of a second set of spatial filters;
receiving, via the node, a channel access indicator response (CAI-R);
sensing, via short channel sensing and employing the spatial filter or another spatial filter of the second set of spatial filters, the channel is clear; and
sending, via the channel, information to the node using one or more spatial filters of the second set of spatial filters.

18. The apparatus of claim 17, further comprising:
terminating transmission on the channel; and
releasing the channel based on one or more of presence, absence and contents of the CAI-R.

19. The apparatus of claim 17, wherein
the beam includes plural beams,
the node includes plural nodes,
each of the plural beams supports one or more of the plural nodes,
the CAI-R is not received from one of the plural nodes, and
the transmission is either not sent to the one plural node, or not sent to the one plural node and another one of the plural nodes sharing one of the plural beams.

20. The apparatus of claim 17, further comprising:
retransmitting the CAI-T to the node.

\* \* \* \* \*